(12) United States Patent
Asai et al.

(10) Patent No.: US 7,349,936 B2
(45) Date of Patent: Mar. 25, 2008

(54) INTERPOLATION METHOD, APPARATUS FOR CARRYING OUT THE METHOD, AND CONTROL PROGRAM FOR IMPLEMENTING THE METHOD

(75) Inventors: Akira Asai, Kanagawa (JP); Shigeki Matsutani, Kanagawa (JP)

(73) Assignee: Canon Kabushiki Kaisha (JP)

( * ) Notice: Subject to any disclaimer, the term of this patent is extended or adjusted under 35 U.S.C. 154(b) by 739 days.

(21) Appl. No.: 10/632,136

(22) Filed: Jul. 31, 2003

(65) Prior Publication Data

US 2004/0093365 A1    May 13, 2004

(30) Foreign Application Priority Data

Jul. 31, 2002    (JP) ............................ 2002-223145

(51) Int. Cl.
*G06F 7/38*    (2006.01)
(52) U.S. Cl. .................................................. 708/290
(58) Field of Classification Search ................ 708/290
See application file for complete search history.

(56) References Cited

U.S. PATENT DOCUMENTS 3,882,304 A * 5/1975 Walters ....................... 700/163
5,175,701 A * 12/1992 Newman et al. ............. 708/290
5,999,184 A * 12/1999 Smalley et al. .............. 345/419

\* cited by examiner

*Primary Examiner*—Tan V. Mai
(74) *Attorney, Agent, or Firm*—Rossi, Kimms & McDowell, LLP

(57) ABSTRACT

There is provided an interpolation method for the Volume-of-Fluid (VOF) applied to a two-phase incompressible fluid, in particular, which makes it possible to cause time evolution of a shape-describing function based on the Volume-of-Fluid (VOF) method while preserving a sharpness of a shape described by the function. The method defines a function F on a one-dimensional structured grid formed on a one-dimensional real region, the function being defined through definition of a value thereof at a center of each cell within the one-dimensional structured grid, as an interpolation function H. With respect to a cell of interest on the one-dimensional structured grid, a slope is set to zero if a forward difference and a backward difference of the function f have different signs, and to a value twice as large as a smaller one of absolute values of the forward difference and the backward difference if the forward difference and the backward difference have the same sign. The function F on a partial region of the one-dimensional real region determined by the cell of interest is defined by a linear function having a value of F0 at a center of the cell of interest and the slope.

3 Claims, 7 Drawing Sheets

INTERPOLATION METHOD, APPARATUS FOR CARRYING OUT THE METHOD, AND CONTROL PROGRAM FOR IMPLEMENTING THE METHOD

BACKGROUND OF THE INVENTION

1. Field of the Invention

The present invention relates to an interpolation method that is used in computational fluid dynamics for realizing the motion of a fluid on a computer, an apparatus for carrying out the method, and a program for implementing the method.

2. Description of the Related Art

In recent years, computational fluid dynamics that realizes the motion of a fluid on a computer has made remarkable progress. However, it is difficult to describe the motion of an object in a fluid, or the motion of two fluids or a multi-layer fluid, and therefore, various approaches have been made to this difficult theme.

To compute a fluid flow around a stationary object, a grid can be generated according to the shape of the object, and it is a conventionally known method of the computation to utilize an unstructured grid or the like based on a finite element method or the like. When the object is moved, a method of changing the grid according to the motion of the object can be employed. However, if the change of the grid involves large deformation, it is generally difficult to perform the computation.

On the other hand, a difference equation that approximately realizes a fluid equation describing a fluid flow on a structured grid, by using duality between a grid (primary grid) and a dual grid known as a staggered grid, is highly reliable due to its stability. This leads to an idea of describing a volume of a substance in each cell as a function on a grid, and moving the function. One example of the method based on this idea utilizes the Volume-of-Fluid method (hereinafter referred to as "the VOF method") for computing a flow of an incompressible fluid. In this case, it is a key technique to move a function describing the volume of the substance of the fluid.

Further, in the case of a compressible fluid, the computation of a flow thereof involves key problems of defining motions of various objects, and in particular, propagation of a shock wave and the like are very closely related with the above-mentioned theme of describing the motion of a substance or an interface.

An initial-value problem concerning an equation (referred to as "an advection equation") describing such a motion is called the Riemann problem after a paper by Riemann on a wave equation concerning a wave in the air "Ueber die Fortpflanzung ebener Luftwellen von endlicher Schwingungsweite (Albhandlungen der Koniglichen Gesellschaft der Wissenschaften zu Gottingen, 8 (1860), 43-65".

As numerical solutions to the Riemann problem, there have been proposed various concepts and schemes, independent of each other or dependent on each other, including a high-order accuracy upwind scheme called the Total Variation Diminishing scheme (hereinafter referred to as "the TVD scheme"), the Essentially Non-Oscillatory scheme (hereinafter referred to as "the ENO scheme") which introduces a limiter function, the Monotone Upstream Centered Scheme for Conservation Laws (hereinafter referred to as "the MUSCL scheme", and the Positivity-Preserving scheme (hereinafter referred to as "the PP scheme".

One of equations dealt with in the present invention is a one-dimensional partial differential equation defined by:

$$\partial F(x,t)/\partial t = \partial C(x,t) F(x,t)/\partial x \quad (1)$$

To perform computation based on the equation, we will now consider the problem of converting this equation into a difference equation. In the following, arguments X, T of a function F(X,T) represent a discrete grid point in space and a discrete time point, respectively.

To solve the equation (1), there have been proposed various computing methods in the computational fluid dynamics as described above. The TVD scheme is to perform the computation under a TVD condition that a TVD value $TV(F[\bullet,n])$ defined by:

$$TV(F[\bullet,n]) = \Sigma j |F[j+1,n] - F[j,n]| \quad (2)$$

does not increase with time evolution, the TVD condition being defined by the following inequality:

$$TV(F[\bullet,n+1]) \leq TV(F[\bullet,n]) \quad (3)$$

The MUSCL scheme, in a broader sense, is a computational method composed of data reconstruction and an approximate Riemann solution.

The ENO scheme is an upwind method with a limiter function in which the MUSCL scheme and the TVD scheme are combined to eliminate vibration occurring when there are discontinuities in the above-described function.

Further, for data reconstruction, there are conventionally employed a method of interpolating the above-described function with a piecewise constant function (which gives first-order accuracy), a method of interpolating the above-described function with a piecewise linear function (which gives second-order accuracy), and a method of interpolating the above-described function by a piecewise parabolic function (which gives third-order accuracy).

The present invention relates to improvement in the second-order accuracy of interpolation.

Now, a description will be given of a conventional second-order ENO scheme.

First, a description will be given of a method of numerically solving the above equation (1) by finding a solution thereto by finite difference approximation, assuming that there is a piecewise linear function:

$$H[I,J](x) = F(I,J) + G(I,J)x \quad (4)$$

If the function $C(I+\frac{1}{2}, J)$ is positive, there is given the following definition:

$$Q(I+\tfrac{1}{2},J) := C(I+\tfrac{1}{2},J) H[I,J](\Delta x/2 - C(I,J)\Delta t/2) \quad (5)$$

If the function is not positive, there is given the following definition:

$$Q(I+1/2, J) := C(I+1/2, J) H[I+1, J] (-\Delta x/2 - C(I+1, J)\Delta t/2) \quad (6)$$

The above equation (1) can be approximately solved by obtaining, from the above definitions, the following equation:

$$F(I, J+1) = F(I, J) + \Delta t (Q(I+1/2, J) - Q(I-1/2, J))/\Delta x \quad (7)$$

On the other hand, a slope function G(I,J) representative of the slope of the piecewise linear function of the equation (4) is defined by the following equation:

$$G(I,J) = \Delta F(I,J)/\Delta x \quad (8)$$

Now, there are various methods of defining ΔF(I,J), as described hereinafter, and typical three of them will be described here.

First, there are introduced the following definitions:

$$Sp(I,J):=F(I+1,J)-F(I,J)$$

$$Sm(I,J):=F(I,J)-F(I-1,J) \qquad (9)$$

A TVD limiter function in one dimension called the minmod function gives ΔF(I,J) defined by:

$$\Delta F(I,J)=(sgn(Sp(I,J))+sgn(Sm(I,J)))\text{Min}(|Sp(I,J)|,|Sm(I,J)|)/2 \qquad (10)$$

A TVD limiter function in one dimension called the averaging limiter function gives ΔF(I,J) defined by:

$$\Delta F(I,J)=(sgn(Sp(I,J))+sgn(Sm(I,J)))\text{Min}(|Sp(I,J)+Sm(I,J)|/2,2|Sp(I,J)|,2|Sm(I,J)|)/2 \qquad (11)$$

A TVD limiter function in one dimension called the superbee limiter function gives ΔF(I,J) defined by:

$$\Delta F(I,J)=(sgn(Sp(I,J))+sgn(Sm(I,J)))\text{Min}(\text{Max}(|Sp(I,J)|,|Sm(I,J)|),2|Sp(I,J)|,2|Sm(I,J)|)/2 \qquad (12)$$

In the above equations (10) to (12), sgn( ) represents a sign function. That is, when the argument thereof is positive i.e. of a plus sign, the function gives a value of 1, while the same is negative i.e. of a minus sign, the function gives a value of −1.

These methods are described e.g. in "A. Suresh, "Positivity-Preserving Schemes in Multidimensions" SIAM J. Sci. Comput. 22, 1184-1198(2000)".

Using these interpolation methods, a function describing a square shape was subjected to advection calculation using the above equation (7). FIGS. 7 to 9 show results of the calculation. More specifically, in FIGS. 7 to 9, shapes are depicted which are given by the function after 100 steps under periodic boundary conditions, using the minmod limiter function, the averaging limiter function, and the superbee limiter function, together with the initial shape for comparison. As is clear from FIGS. 7 to 9, the square shape as the initial shape is drastically lost into dull shapes.

Next, a description will be given of an algorithm for a higher dimension obtained by extending the algorithm for one dimension described heretofore. A method employed in the algorithm for a higher dimension described here is disclosed in the above-mentioned literature.

Suppose that F(I,J,T) represents a function of a point on a two-dimensional grid at a given time T, wherein I and J are integers and cooperatively represent a grid point on the two-dimensional grid.

For the function, there are defined the following values:

$$V\text{min}=\text{Min}(F(I-1,J+1,T)-F(I,J,T),F(I,J+1,T)-F(I,J,T),F(I+1,J+1,T)-F(I,J,T),F(I-1,J,T)-F(I,J,T),-\epsilon,F(I+1,J,T)-F(I,J,T),F(I-1,J-1,T)-F(I,J,T),F(I,J-1,T)-F(I,J,T),F(I+1,J-1,T)-F(I,J,T))$$

$$V\text{max}=\text{Max}(F(I-1,J+1,T)-F(I,J,T),F(I,J+1,T)-F(I,J,T),F(I+1,J+1,T)-F(I,J,T),F(I-1,J,T)-F(I,J,T),\epsilon,F(I+1,J,T)-F(I,J,T),F(I-1,J-1,T)-F(I,J,T),F(I,J-1,T)-F(I,J,T),F(I+1,J-1,T)-F(I,J,T)) \qquad (13)$$

Further, there are defined:

$$Sx(I,J,T)=(F(I+1,J,T)-F(I-1,J,T))/2$$

$$Sy(I,J,T)=(F(I,J+1,T)-F(I,J-1,T))/2 \qquad (14)$$

$$V=2(\text{Min}(|V\text{min}|,|V\text{max}|))/(|Sx(I,J,T)|+|Sx(I,J,T)|+\epsilon) \qquad (15)$$

At this time, after defining:

$$Gx(I,J,T)=\text{Min}(1,V)Sx(I,J,T)/\Delta x$$

$$Gy(I,J,T)=\text{Min}(1,V)Sy(I,J,T)/\Delta y \qquad (16)$$

an interpolation function H(I,J,T)(x,y) for a grid point (I,J) is defined as:

$$H(I,J,T)(x,y)=F(I,J,T)+Gx(I,J,T)x+Gy(I,J,T)y \qquad (17)$$

By using the method, with respect to initial values of a function shown in FIG. 10A, advection calculation of the function can be carried, a result of which is shown in FIG. 10B.

However, the conventional interpolation method suffers from the following problem:

In the Volume-of-Fluid (VOF) method applied to a two-phase incompressible fluid, how to cause time evolution of a shape-describing function descriptive of a shape as a result of the advection calculation while preserving the shape described by the function is a matter of great interest, but the conventional interpolation method tends to cause progressive loss of the initial shape into a dull shape, with execution of computational steps.

In view of this problem, a computational algorithm enabling the shape to be preserved more effectively is indispensable, and to this end, for an algorithm for one dimension, it is necessary to replace the interpolation function of the equation (4) by an improved one, and for an algorithm for a higher dimension, it is necessary to replace the interpolation function of the equation (17) by an improved one.

SUMMARY OF THE INVENTION

The present invention has been made in view of the above problems of the prior art, and it is an object of the present invention is to provide an interpolation method for the Volume-of-Fluid (VOF) method applied to a two-phase incompressible fluid, in particular, which makes it possible to cause time evolution of a shape-describing function based on the Volume-of-Fluid (VOF) method while preserving a sharpness of a shape described by the function, an apparatus for carrying out the method, and a control program for implementing the method.

To attain the above object, in a first aspect of the present invention, there is provided an interpolation method of defining a function F on a one-dimensional structured grid formed on a one-dimensional real region, the function being defined through definition of a value thereof at a center of each cell within the one-dimensional structured grid, as an interpolation function H, the method comprising the steps of setting, with respect to a cell of interest on the one-dimensional structured grid, a slope to zero if a forward difference and a backward difference of the function f have different signs, and to a value twice as large as a smaller one of absolute values of the forward difference and the backward difference if the forward difference and the backward difference have the same sign, and defining the function F on a partial region of the one-dimensional real region determined by the cell of interest, by a linear function having a value of F0 at a center of the cell of interest and the slope.

With the arrangement of the interpolation method according to the first aspect of the present invention, it is possible to realize an interpolation algorithm for the Volume-of-Fluid (VOF) method applied to a two-phase incompressible fluid, in particular, which makes it possible to cause time evolution of a shape-describing function based on the Volume-of-Fluid (VOF) method while preserving a sharpness of a shape described by the function, and the function gives very excellent results of describing the shape.

Preferably, the interpolation method is applied to as a numerical solution of an advection-type differential equation.

To attain the above object, in a second aspect of the present invention, there is provided an interpolation method of defining a function F on a two-dimensional structured grid formed on a two-dimensional real region, the function being defined through definition of a value thereof at a center of each cell within the two-dimensional structured grid, as an interpolation function H, the method comprising the steps of setting a cell of interest to a cell A, the cell A having a first side extending in an x direction, a second side extending in the x direction and being opposite to the first side, a third side extending in a y direction, and a fourth side extending in the y direction and being opposite to the third side, defining values twice as large as values of one-sided differences of the function F between a center of the cell A and respective centers of four cells adjacent to the cell A on the first side, the second side, the third side, and the fourth side, as a first-sided difference (DFxmin), a second-sided difference (DFxmax), a third-sided difference (DFymin), and a fourth-sided difference (DFymax), respectively, and setting an x-direction difference to zero if the first-sided difference and the second-sided difference have different signs, and to a smaller one of absolute values of the first-sided difference and the second-sided difference if the first-sided difference and the second-sided difference have the same sign, and a y-direction difference to zero if the third-sided difference and the fourth-sided difference have different signs, and to a smaller one of absolute values of the third-sided difference and the fourth-sided difference if the third-sided differences and the fourth-sided difference have the same sign, forming an interpolation function candidate which has slopes defined by the x-direction difference and the y-direction difference, respectively, and has a value F0 of the function F at the center of the cell A and setting this candidate to a plane B, modifying, if a value of the plane B at a first grid point at a location of intersection of the first side and the third side of the cell A is larger than a value of the center of the cell A, the plane B by multiplying the x-direction difference and the y-direction difference by a largest constant not more than 1 such that the value of the plane B at the first grid point does not exceed any of values of the function F at respective centers of three cells having the first grid point in common except for the cell A, modifying, if the value of the plane B at the first grid point is smaller than the value of the center of the cell A, the plane B by multiplying the x-direction difference and the y-direction difference by a largest constant not more than 1 such that the value of the plane B at the first grid point does not fall below any of the values of the function F at the respective centers of the three cells having the grid point in common except for the cell A, and carrying out, on the plane B thus obtained, the same operation as carried out as to the first grid point, as to a second grid point at a location of intersection of the first side and the fourth side of the cell A, a third grid point at a location of intersection of the second side and the third side, and a fourth grid point at a location of intersection of the second side and the fourth side, to thereby change the slope of the plane B, and define the resulting plane as the interpolation function within the cell A.

With the arrangement of the interpolation method according to the second aspect of the present invention, it is possible to obtain the same advantageous effects as provided by the first aspect of the present invention.

To attain the above object, in a third aspect of the present invention, there is provided an interpolation method of defining a function F on a three-dimensional structured grid formed on a three-dimensional real region, the function being defined through definition of a value thereof at a center of each cell within the three-dimensional structured grid, as an interpolation function H, the method comprising the steps of setting a cell of interest to a cell A, the cell A having a first side extending in an x direction, a second side extending in the x direction and being opposite to the first side, a third side extending in a y direction, a fourth side extending in the y direction and being opposite to the third side, a fifth side in a z direction, and a sixth side extending in the z direction and being opposite to the fifth side, defining values twice as large as values of one-sided differences of the function F between a center of the cell A and respective centers of six cells adjacent to the cell A on the first side, the second side, the third side, the fourth side, the fifth side, and the sixth side, as a first-sided difference (DFxmin), a second-sided difference (DFxmax), a third-sided difference (DFymin), a fourth-sided difference (DFymax), a fifth-sided difference (DFzmax), and a sixth-sided difference (DFzmin), respectively, and setting an x-direction difference to zero if the first-sided difference and the second-sided difference have different signs, and to a smaller one of absolute values of the first-sided difference and the second-sided difference if the first-sided difference and the second-sided difference have the same sign, a y-direction difference to zero if the third-sided difference and the fourth-sided difference have different signs, and to a smaller one of absolute values of the third-sided difference and the fourth-sided difference if the third-sided differences and the fourth-sided difference have the same sign, and a z-direction difference to zero if the fifth-sided difference and the sixth-sided difference have different signs, and to a smaller one of absolute values of the fifth-sided difference and the sixth-sided difference if the fifth-sided difference and the sixth-sided difference have the same sign, forming an interpolation function candidate which has slopes defined by the x-direction difference, the y-direction difference, and the z-direction difference, respectively, and has a value F0 of the function F at the center of the cell A and setting this candidate to a plane B, modifying, if a value of the plane B at a first grid point at a location of intersection of the first side, the third side, and the fifth side of the cell A is larger than the value of the center of the cell A, the plane B by multiplying the x-direction difference, the y-direction difference, and the z-direction difference, by a largest constant not more than 1 such that the value of the plane B at the first grid point does not exceed any of the values of the function F at respective centers of seven cells having the first grid point in common except for the cell A, modifying, if the value of the plane B at the first grid point is smaller than the value of the center of the cell A, the plane B by multiplying the x-direction difference, the y-direction difference, and the z-direction difference, by a largest constant not more than 1 such that the value of the plane B at the first grid point does not fall below any of the values of the function F at the respective centers of the seven cells having the grid point in common except for the cell A, and carrying out, on the plane B thus obtained, the same operation as carried out as to the first grid point, on a second grid point at a location of intersection of the first side, the third side, and the sixth side, a third grid point at a location of intersection of the first side, the fourth side, and the fifth side, a fourth grid point at a location of intersection of the first side, the fourth side, and the sixth side, a fifth grid point at a location of intersection of the second side, the third side, and the fifth side, and a sixth grid point at a location of intersection of the second side, the third side, and the sixth side, a seventh grid point at a location of intersection of the second side, the fourth side, and the fifth side, and an eighth grid point at a location of intersection of the second side, the fourth side, and the sixth side, to thereby change the slope of the plane, and define the resulting plane as the interpolation function within the cell A.

With the arrangement of the interpolation method according to the third aspect of the present invention, it is possible to obtain the same advantageous effects as provided by the first aspect of the present invention.

To attain the above object, in a fourth aspect of the present invention, there is provided an apparatus for carrying out an interpolation method of defining a function F on a one-dimensional structured grid formed on a one-dimensional real region, the function being defined through definition of a value thereof at a center of each cell within the one-dimensional structured grid, as an interpolation function H, the apparatus comprising a setting device that sets, with respect to a cell of interest on the one-dimensional structured grid, a slope to zero if a forward difference and a backward difference of the function F have different signs, and to a value twice as large as a smaller one of absolute values of the forward difference and the backward difference, and a definition device that defines the function F on a partial region of the one-dimensional real region determined by the cell of interest, by a linear function having a value of F0 at a center of the cell of interest and the slope.

With the arrangement of the apparatus according to the fourth aspect of the present invention, it is possible to obtain the same advantageous effects as provided by the first aspect of the present invention.

To attain the above object, in a fifth aspect of the present invention, there is provided an apparatus for carrying out an interpolation method of defining a function F on a two-dimensional structured grid formed on a two-dimensional real region, the function being defined through definition of a value thereof at a center of each cell within the two-dimensional structured grid, as an interpolation function H, the apparatus comprising a cell-setting device that sets a cell of interest to a cell A, the cell A having a first side extending in an x direction, a second side extending in the x direction and being opposite to the first side, a third side extending in a y direction, and a fourth side extending in the y direction and being opposite to the third side, a difference-setting device that defines values twice as large as values of one-sided differences of the function F between a center of the cell A and respective centers of four cells adjacent to the cell A on the first side, the second side, the third side, and the fourth side, as a first-sided difference (DFxmin), a second-sided difference (DFxmax), a third-sided difference (DFymin), and a fourth-sided difference (DFymax), respectively, and sets an x-direction difference to zero if the first-sided difference and the second-sided difference have different signs, and to a smaller one of absolute values of the first-sided difference and the second-sided difference if the first-sided difference and the second-sided difference have the same sign, and a y-direction difference to zero if the third-sided difference and the fourth-sided difference have different signs, and to a smaller one of absolute values of the third-sided difference and the fourth-sided difference if the third-sided differences and the fourth-sided difference have the same sign, an interpolation function candidate-forming device that forms an interpolation function candidate which has slopes defined by the x-direction difference and the y-direction difference, respectively, and has a value F0 of the function F at the center of the cell A and setting this candidate to a plane B, a first modification device that modifies, if a value of the plane B at a first grid point at a location of intersection of the first side and the third side of the cell A is larger than a value of the center of the cell A, the plane B by multiplying the x-direction difference and the y-direction difference by a largest constant not more than 1 such that the value of the plane B at the first grid point does not exceed any of values of the function F at respective centers of three cells having the first grid point in common except for the cell A, a second modification device that modifies, if the value of the plane B at the first grid point is smaller than the value of the center of the cell A, the plane B by multiplying the x-direction difference and the y-direction difference by a largest constant not more than 1 such that the value of the plane B at the first grid point does not fall below any of the values of the function F at the respective centers of the three cells having the grid point in common except for the cell A, and a definition device that carries out, on the plane B thus obtained, the same operation as carried out as to the first grid point, as to a second grid point at a location of intersection of the first side and the fourth side of the cell A, a third grid point at a location of intersection of the second side and the third side, and a fourth grid point at a location of intersection of the second side and the fourth side, to thereby change the slope of the plane B, and define the resulting plane as the interpolation function within the cell A.

With the arrangement of the apparatus according to the fifth aspect of the present invention, it is possible to obtain the same advantageous effects as provided by the first aspect of the present invention.

To attain the above object, in a sixth aspect of the present invention, there is provided an apparatus for carrying out an interpolation method of defining a function F on a three-dimensional structured grid formed on a three-dimensional real region, the function being defined through definition of a value thereof at a center of each cell within the three-dimensional structured grid, as an interpolation function H, the apparatus comprising a cell-setting device that sets a cell of interest to a cell A, the cell A having a first side extending in an x direction, a second side extending in the x direction and being opposite to the first side, a third side extending in a y direction, a fourth side extending in the y direction and being opposite to the third side, a fifth side in a z direction, and a sixth side extending in the z direction and being opposite to the fifth side, a difference-setting device that defines values twice as large as values of one-sided differences of the function F between a center of the cell A and respective centers of six cells adjacent to the cell A on the first side, the second side, the third side, the fourth side, the fifth side, and the sixth side, as a first-sided difference (DFxmin), a second-sided difference (DFxmax), a third-sided difference (DFymin), a fourth-sided difference (DFymax), a fifth-sided difference (DFzmax), and a sixth-sided difference (DFzmin), respectively, and sets an x-direction difference to zero if the first-sided difference and the second-sided difference have different signs, and to a smaller one of absolute values of the first-sided difference and the second-sided difference if the first-sided difference and the second-sided difference have the same sign, a y-direction difference to zero if the third-sided difference and the fourth-sided difference have different signs, and to a smaller one of absolute values of the third-sided difference and the fourth-sided difference if the third-sided differences and the fourth-sided difference have the same sign, and a z-direction difference to zero if the fifth-sided difference and the sixth-sided difference have different signs, and to a smaller one of absolute values of the fifth-sided difference and the sixth-sided difference if the fifth-sided difference and the sixth-sided difference have the same sign, an interpolation function candidate-forming device that forms an interpolation function candidate which has slopes defined by the x-direction difference, the y-direction difference, and the z-direction difference, respectively, and has a value F0 of the function F at the center of the cell A, and setting this candidate to a plane B, a first modification device that modifies, if a value of the plane B at a first grid point at a location of intersection of the first side, the third side, and the fifth side of the cell A is larger than the value of the center of the cell A, the plane B by multiplying the x-direction difference, the y-direction difference, and the z-direction difference, by a largest constant not more than 1 such that the value of the plane B at the first grid point does not exceed any of the values of the function F at respective centers of seven cells having the first grid point in common except for the cell A, a second modification device that modifies, if the value of the plane B at the first grid point is smaller than the value of the center of the cell A, the plane B by multiplying the x-direction difference, the y-direction difference, and the z-direction difference, by a largest constant not more than 1 such that the value of the plane B at the first grid point does not fall below any of the values of the function F at the respective centers of the seven cells having the grid point in common except for the cell A, and a definition device that carries out, on the plane B thus obtained, the same operation as carried out as to the first grid point, on a second grid point at a location of intersection of the first side, the third side, and the sixth side, a third grid point at a location of intersection of the first side, the fourth side, and the fifth side, a fourth grid point at a location of intersection of the first side, the fourth side, and the sixth side, a fifth grid point at a location of intersection of the second side, the third side, and the fifth side, and a sixth grid point at a location of intersection of the second side, the third side, and the sixth side, a seventh grid point at a location of intersection of the second side, the fourth side, and the fifth side, and an eighth grid point at a location of intersection of the second side, the fourth side, and the sixth side, to thereby change the slope of the plane, and define the resulting plane as the interpolation function within the cell A.

With the arrangement of the apparatus according to the sixth aspect of the present invention, it is possible to obtain the same advantageous effects as provided by the first aspect of the present invention.

To attain the above object, in a seventh aspect of the present invention, there is provided a control program for causing a computer to execute the interpolation method as recited hereinabove as the interpolation method according to the first aspect of the present invention.

To attain the above object, in an eighth aspect of the present invention, there is provided a control program for causing a computer to execute the interpolation method as recited hereinabove as the interpolation method according to the second aspect of the present invention.

To attain the above object, in a ninth aspect of the present invention, there is provided a control program for causing a computer to execute the interpolation method as recited hereinabove as the interpolation method according to the third aspect of the present invention.

With the arrangement of each of the control programs according to the seventh to ninth aspects of the present invention, it is possible to obtain the same advantageous effects as provided by the first aspect of the present invention.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
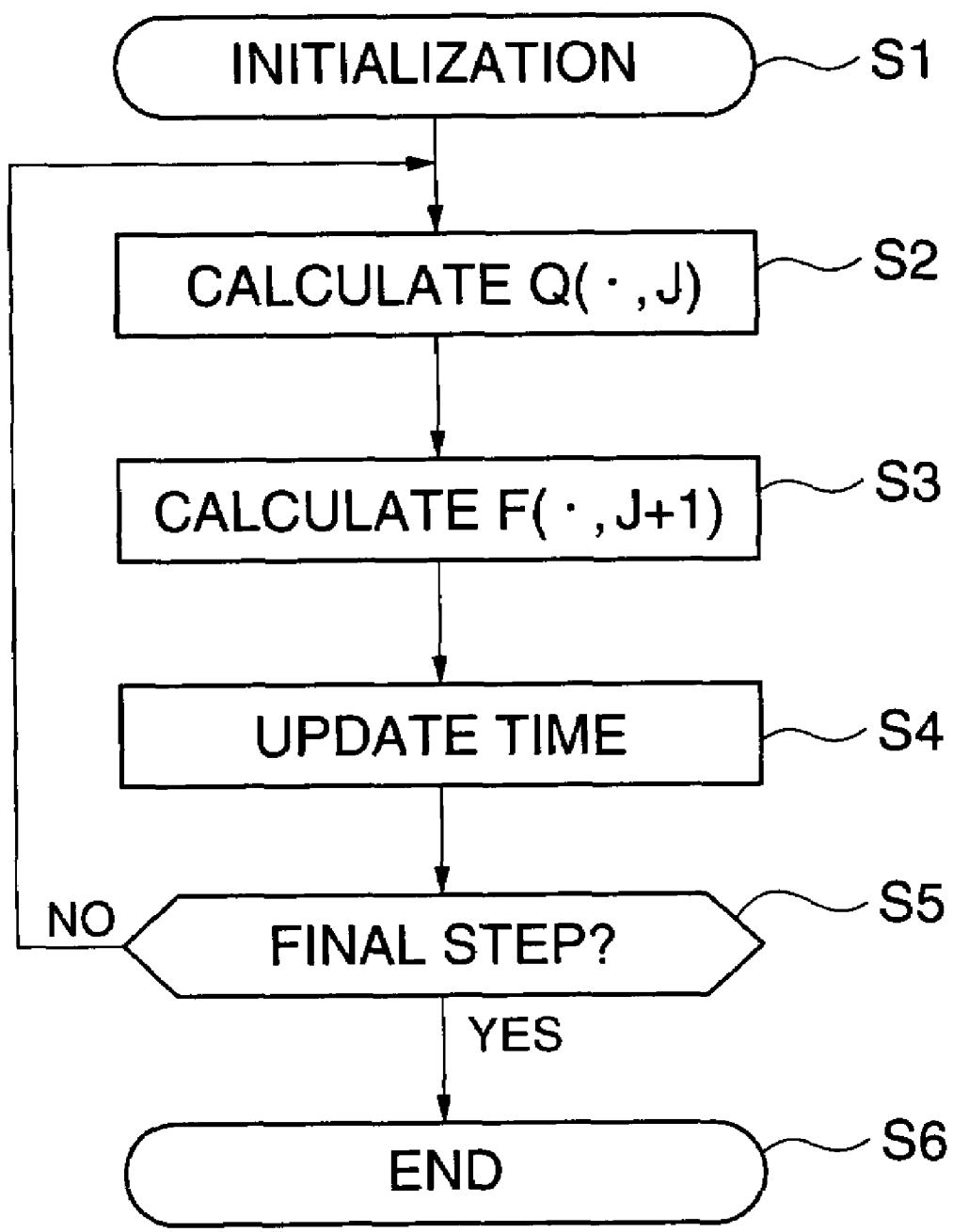
FIG. 1 is a flowchart showing a process of advection calculation using an interpolation method according to a first embodiment of the present invention.

The present invention will now be described in detail below with reference to the accompanying drawings showing preferred embodiments thereof. In the drawings, elements and parts which are identical throughout the views are designated by identical reference numeral, and duplicate description thereof is omitted.

First, an interpolation method according to a first embodiment of the invention will be described. The method according to the present embodiment interpolates a function by a piecewise linear function, for data reconstruction. That is, as a numerical solution to an advection equation, the present interpolation method corresponds to a solution of the second-order accuracy.

In the present embodiment, as a problem for one dimension, we will consider the problem of converting a one-dimensional partial differential equation defined by:

$$\partial F(x,t)/\partial t = \partial C(x,t)F(x,t)/\partial x \qquad (18)$$

into a difference equation to perform computation based on the equation. In the following, arguments X, T of a function F(X,T) represent a discrete grid point in space and a discrete time point, respectively.

First, it is assumed that the interpolation function $H[I,J](x)$ according to the present embodiment has been already obtained as a piecewise linear function as follows:

$$H[I,J](x)=F(I,J)+G(I,J)x \quad (19)$$

With this assumption, a description will be given of a method of numerically solving the above equation (18) by finding a solution thereto by finite difference approximation. A method of determining the coefficient $G(I,J)$ of the interpolation function $H[I,J](x)$ of the present embodiment will be described hereinafter. As described later, the method of determining the coefficient $G(I,J)$ characterizes the interpolation algorithm according to the present embodiment. It is essential to the present embodiment that the coefficient $G(I,J)$ is determined by using neighboring information of geometric properties of the grid.

In short, when there are provided a one-dimensional structured grid formed on a one-dimensional real region, and a function $F(X,T)$ on the one-dimensional structured grid, the function being defined through definition of a value thereof at the center of each cell within the one-dimensional structured grid, the function $F(X,T)$ is defined as an interpolation function $H[I,J](x)$ on the one-dimensional real region by using the function $F(X,T)$ and the geometry of the grid. In other words, while the function F defines mapping by discrete points alone, the function H extends the definition range of mapping over the entire X axis.

If the function $C(I+\frac{1}{2}, J)$ is positive, there is given the following definition:

$$Q(I+\tfrac{1}{2},J):=C(I+\tfrac{1}{2},J)H[I,J](\Delta x/2-C(I,J)\Delta t/2) \quad (20)$$

If the same is not positive, there is given the following definition:

$$Q(I+\tfrac{1}{2},J):=C(I+\tfrac{1}{2},J)H[I+1,J](-\Delta x/2-C(I,J)\Delta t/2) \quad (21)$$

From the above definitions, there is obtained the following equation:

$$F(I,J+1)=F(I,J)+\Delta t(Q(I+\tfrac{1}{2},J)-Q(I-\tfrac{1}{2},J))/\Delta x \quad (22)$$

On the other hand, the slope function $G(I,J)$ representative of the slope of the piecewise linear function is defined in the following manner:

First, there are introduced the following definitions:

$$Sp(I,J):=F(I+1,J)-F(I,J)$$

$$Sm(I,J):=F(I,J)-F(I-1,J) \quad (23)$$

Further, there is introduced a limiter function in one dimension for the present embodiment, defined by:

$$\Delta F(I,J)=(sgn(Sp(I,J))+sgn(Sm(I,J)))Min(|Sp(I,J)|,|Sm(I,J)|) \quad (24)$$

In this equation, sgn( ) represents a sign function. That is, when the argument thereof is positive or of a plus sign, the function gives a value of 1, while the same is negative i.e. of a minus, the function gives a value of −1. It is essential that the value is 2 times larger than the conventional minmod limiter function. By using the $\Delta F(I,J)$, it is only required to define the slope function as:

$$G(I,J)=\Delta F(I,J)/\Delta x \quad (25)$$

An expression $Sp(I,J)/\Delta x$ means a forward difference from the corresponding one of the definitions of the above equations (23), while an expression $Sm(I,J)/\Delta x$ means a backward difference from the corresponding one of the definitions of the same. If the terms $Sp(I,J)$ and $Sm(I,J)$ have different signs, the sum $(sgn(SpI,J)+sgn(Sm(I,J))$ becomes equal to zero, and hence the whole limiter function $\Delta F(I,J)$ and therefore the slope function $G(I,J)$ becomes equal to zero. If the terms do not have different signs, the slope function $G(I,J)$ becomes equal to a value twice as large as the smaller one of the absolute values of the forward difference and the backward difference, since the sum $(sgn(SpI,J)+sgn(Sm(I,J))$ becomes equal to 2 or −2.

As described above, according to the interpolation method of the present embodiment, with respect to a cell of interest on the one-dimensional structured grid, the slope of the function $H(I,J)$ is set to zero if the signs of the forward difference and the backward difference of the mapping F on the cell are different from each other, and to a value twice as large as the smaller one of the absolute values of the differences if the signs are the same, the value $F(X,T)$ at the center of the cell of interest is determined as the linear function, and based on the linear function thus determined, values of the function $H(I,J)$ on a partial region of the one-dimensional real region determined by the cell are defined.

FIG. 1 is a flowchart showing a process of advection calculation using the above described interpolation method according to the first embodiment.

First, in a step S1, initialization is performed, e.g. by generating a grid, determining time step intervals, and then initializing the initial shape of a function $F(\bullet,1)$.

In the following step S2, the computation of the above-described equation $Q(\bullet,J)$ (see the equations (20) and (21)) is performed. At this time, as shown in the above equations (20) and (21), the interpolation function H according to the present embodiment is used. Then, in a step S3, based on data obtained by the equation $Q(\bullet,J)$, the computation of the function $F(\bullet,J+1)$ is carried out (see the above equation (22)).

Thereafter, time is updated in a step S4. More specifically, the problem being solved now is a time evolution equation expressed by the above equation (18), and according to the conventional practice of numerical solution of an ordinary time evolution equation, the value $F(\bullet,J)$ of the function F at time $T=\Delta tJ$ is determined from the value $F(\bullet,J-1)$, and then time is changed from $T=\Delta t^*(J-1)$ to $T=\Delta t^*J$.

Then, in a step S5, it is determined whether or not the present step is a final step, and if the present step is not a final step, the process returns to the step S2, whereby the present computation is performed until it is determined that the present step is a final step.

Figure 2:
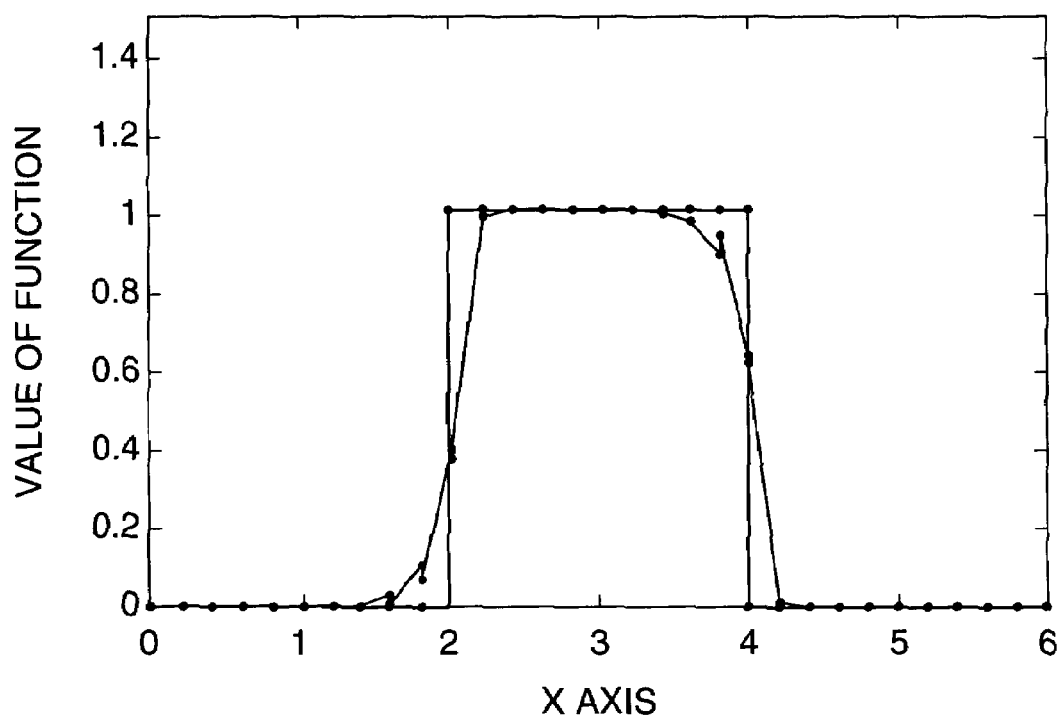
FIG. 2 is a diagram showing results of the advection calculation using the interpolation method illustrated in FIG. 1.
Figure 7:
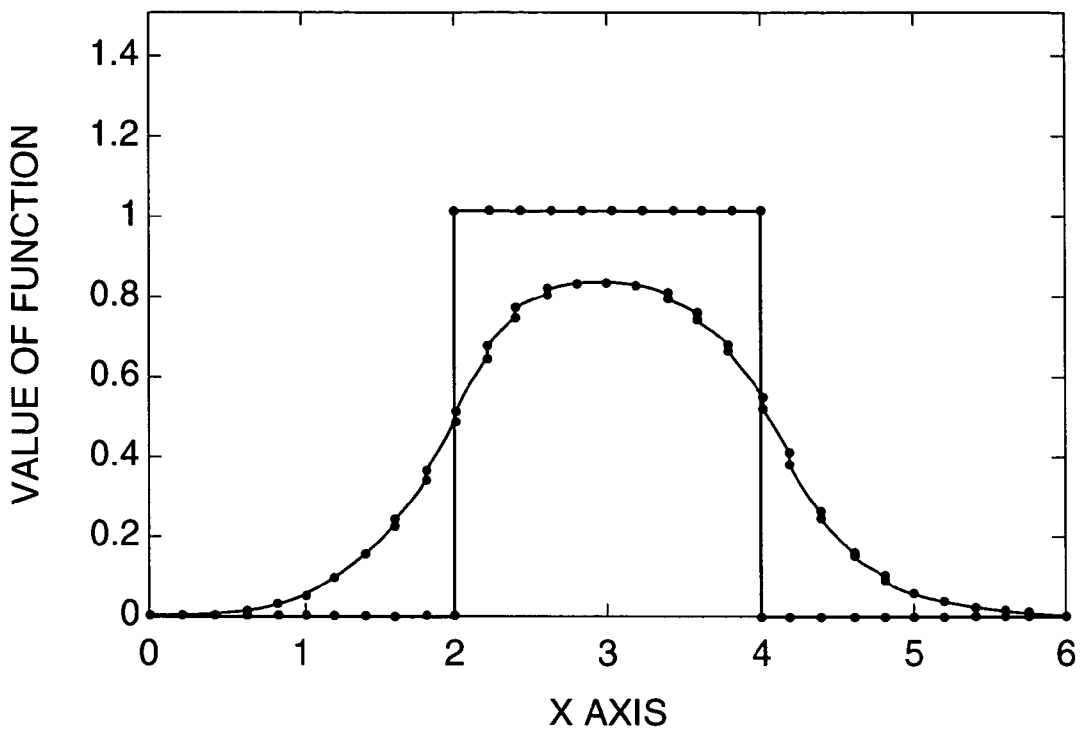
FIG. 7 is a diagram showing results of advection calculation using a conventional minmod limiter function.
Figure 8:
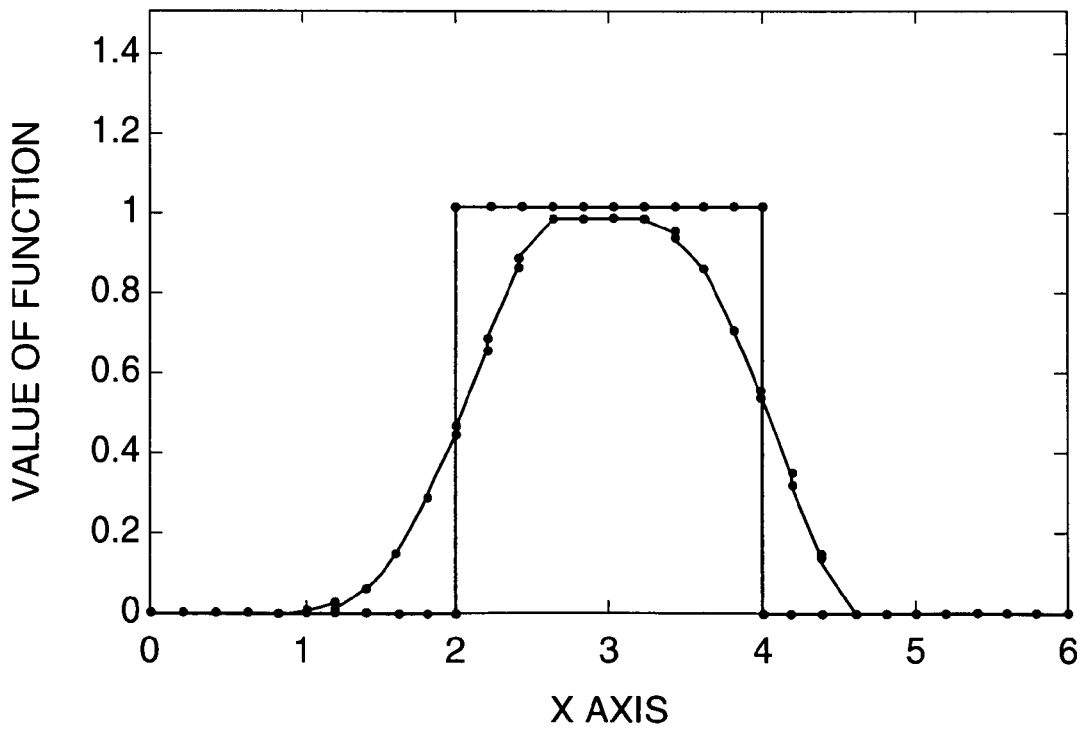
FIG. 8 is a diagram showing results of advection calculation using a conventional averaging limiter function.
Figure 9:
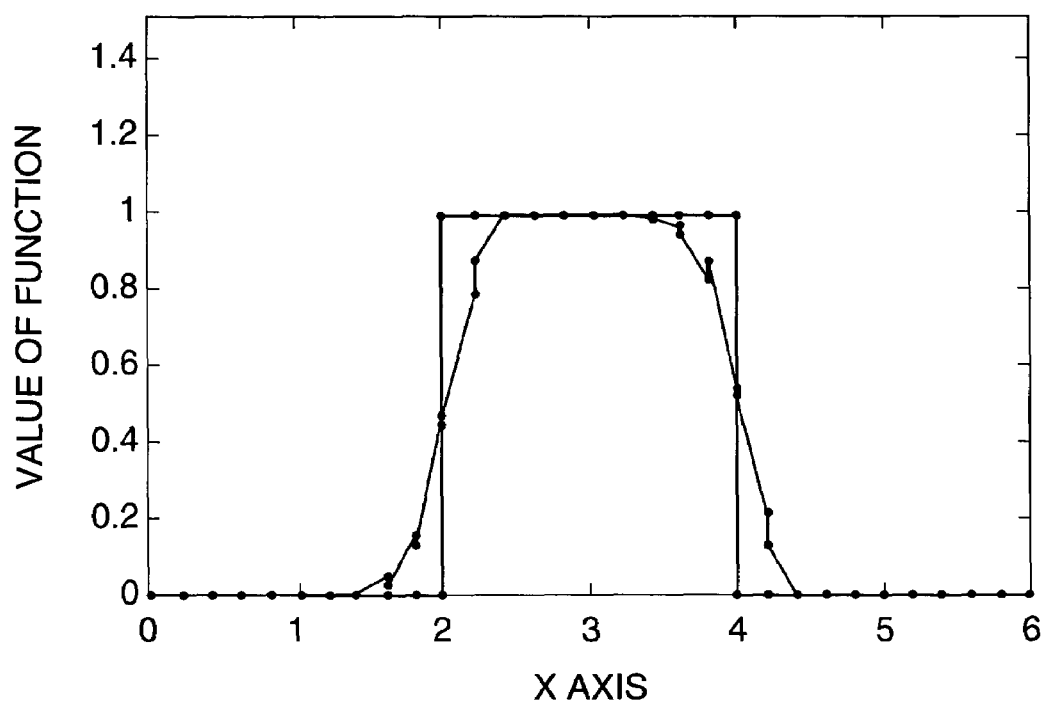
FIG. 9 is a diagram showing results of advection calculation using a conventional superbee limiter function.

The use of the interpolation method according to the present embodiment provides two separate regions, one defined by a function with a slope of zero, and the other defined by a function with a sharp slope, which makes it possible to obtain very good results as a function describing the shape of a two-phase incompressible fluid. FIG. 2 shows a result of the computation. The present computation is carried out under the same conditions corresponding to those of the conventional computations results of which are shown in FIGS. 7 to 9, and the shape corresponding to the initial value and that after 1000 steps are depicted in FIG. 2. It will be understood that the result of advection calculation carried out by the interpolation method according to the present embodiment shown in FIG. 2 maintains a very sharp rectangular shape compared with those shown in FIGS. 7 to 9.

Next, a description will be given of an apparatus for carrying out the interpolation method according to the present embodiment.

Figure 3:
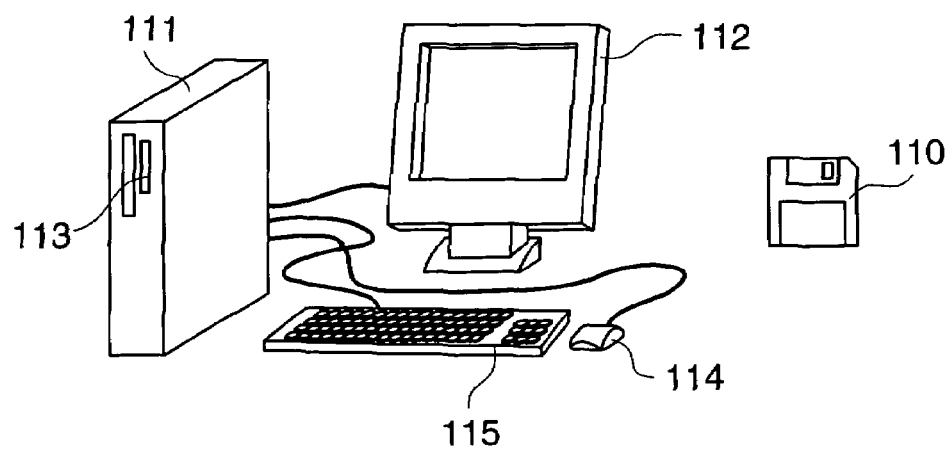
FIG. 3 is a perspective view of a computer system for executing the advection calculation using the interpolation method illustrated in FIG. 1.
Figure 4:
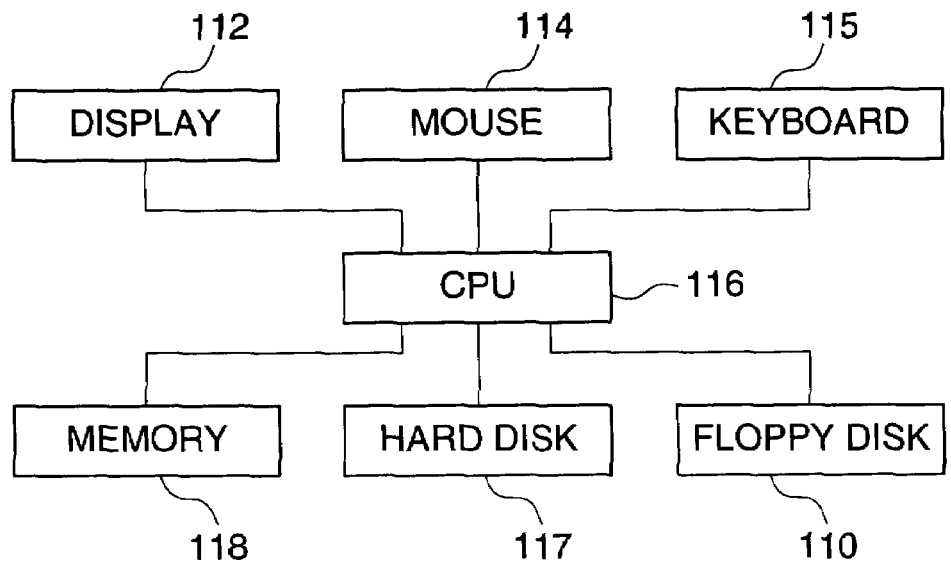
FIG. 4 is a block diagram showing the arrangement of essential components of the computer system using the interpolation method illustrated in FIG. 1.

FIG. 3 is a perspective view of a computer system for executing advection calculation using the interpolation method shown in FIG. 1, and FIG. 4 is a block diagram showing the arrangement of essential components of the computer system.

As shown in FIGS. 3 and 4, the computer system for carrying out the interpolation method is comprised of a processor including a plurality of CPU's 116 and a memory 118, a storage device including a hard disk 117 and a floppy (registered trademark) disk 110, an input section including a keyboard 115 and a mouse 114, and an output display section including a display 112. The processor and other components are accommodated in a main body 111.

This computer system loads a program designed according to the flowchart shown in FIG. 1 and encoded, into the memory 118, reserves storage for necessary computation, performs predetermined arithmetic operations based on a shape of a region, coordinates of grid points, and physical quantities, which have been input by an appropriate method, and writes values of the physical quantities obtained on the region by the arithmetic operations into the hard disk 117 or the like for storage and/or causes the same to be displayed on the display 112.

The use of the interpolation method according to the present embodiment makes it possible to form a function on the real axis from values given on the grid points though the values include discontinuities. Therefore, even when the present invention is applied to a usage different from the present embodiment, e.g. data extraction in signal processing, or one-dimensional image processing, it is possible to express a sharp shape.

Next, a description will be given of an interpolation method according to a second embodiment of the present invention. In the second embodiment, the interpolation algorithm for a one-dimensional grid, described hereinabove as to the first embodiment, is extended to one for a two-dimensional grid.

The equation dealt with in the present embodiment is a partial differential equation in a two-dimensional space, defined by:

$$\partial F(x,y,t)/\partial t = \partial Cx(x,y,t)F(x,y,t)/\partial x + \partial Cy(x,y,t)F(x,y,t)/\partial y \quad (26)$$

The problem of converting this function to a difference equation for computation will now be considered. Suppose a function $F(X,Y,T)$ as a discretized form of $F(x,y,t)$. The arguments $X$, $Y$, in the function $F$ cooperatively represent a discrete spacial grid point and the argument $T$ in the same represents a discrete time.

First, it is assumed that an interpolation function $H[I,J,T](x,y)$ according to the present embodiment has already been obtained as the following piecewise linear function:

$$H[I,J,T](x,y) = F(I,J,T) + Gx(I,J,T)x + Gy(I,J,T)y \quad (27)$$

With this assumption, a description will be given of a method of numerically solving the above equation (26) by finding a solution thereto by finite difference approximation. A method of determining coefficients $Gx(I,J,T)$ and $Gy(I,J,T)$ of the interpolation function $H[I,J,T](x,y)$ of the present embodiment will be described hereinafter. As described later, the method of determining the coefficients $Gx(I,J,T)$ and $Gy(I,J,T)$ characterizes the interpolation algorithm according to the present embodiment. It is essential to the present embodiment that the coefficients $Gx(I,J,T)$ and $Gy(I,J,T)$ are determined by using neighboring information of geometric properties of the grid.

In short, when there are provided a two-dimensional structured grid formed on a two-dimensional real region, and a function $F(X,Y,T)$ on the two-dimensional structured grid, the function being defined through definition of a value thereof at the center of each cell within the two-dimensional structured grid, the function $F(X,Y,T)$ is defined as an interpolation function $H[I,J,T](x,y)$ on the two-dimensional real region by using the function $F(X,Y,T)$ and the geometry of the grid.

If the function $Cx(I+\frac{1}{2}, J,T)$ is positive, there is given the following definition:

$$Qx(I+\tfrac{1}{2},J,T) := Cx(I+\tfrac{1}{2},J,T)H[I,J,T](\Delta x/2 - Cx(I,J,T)\Delta t/2, -Cy(I,J,T)\Delta t/2) \quad (28)$$

If the function $Cx(I+\frac{1}{2}, J,T)$ is not positive, there is given the following definition:

$$Qx(I+\tfrac{1}{2},J,T) := Cx(I+\tfrac{1}{2},J,T)H[I+1,J,T](-\Delta x/2 + Cx(I,J,T)\Delta t/2, -Cy(I,J,T)\Delta t/2) \quad (29)$$

If the function $Cy(I,J+\frac{1}{2}, T)$ is positive, there is given the following definition:

$$Qy(I,J+\tfrac{1}{2},T) := Cy(I,J+\tfrac{1}{2},T)H[I,J,T](-Cx(I,J,T)\Delta t/2, \Delta y/2 - Cy(I,J,T)\Delta t/2) \quad (30)$$

If the function $Cy(I,J+\frac{1}{2}, T)$ is not positive, there is given the following definition:

$$Qy(I,J+\tfrac{1}{2},J,T) := Cy(I,J+\tfrac{1}{2},T)H[I,J+1,T](-Cx(I,J,T)\Delta t/2, -\Delta y/2 - Cy(I,J,T)\Delta t/2) \quad (31)$$

From the above definitions, there is obtained the following equation:

$$F(I,J,T+1) = F(I,J,T) + \Delta t(Qx(I+\tfrac{1}{2},J,T) - Qx(I-\tfrac{1}{2},J,T))/\Delta x + \Delta t(Qy(I,J+\tfrac{1}{2},T) - Qy(I,J-\tfrac{1}{2},T) - Qx(I,J-\tfrac{1}{2},T))/\Delta y \quad (32)$$

On the other hand, a slope function $G(I,J,T)$ representative of the slope of the piecewise linear function is defined in the following manner:

First, there are introduced the following definitions:

$$Sxp(I,J,T) := F(I+1,J,T) - F(I,J,T)$$

$$Sxm(I,J,T) := F(I,J,T) - F(I-1,J,T)$$

$$Syp(I,J,T) := F(I,J+1,T) - F(I,J,T)$$

$$Sym(I,J,T) := F(I,J,T) - F(I,J-1,T) \quad (33)$$

Further, there are introduced limiter functions in one dimension for the present embodiment, defined by:

$$Sx(I,J) = (sgn(Sxp(I,J,T)) + sgn(Sxm(I,J,T)))\text{Min}(|Sxp(I,J,T)|, |Sxm(I,J,T)|)$$

$$Sy(I,J) = (sgn(Syp(I,J,T)) + sgn(Sym(I,J,T)))\text{Min}(|Syp(I,J,T)|, |Sym(I,J,T)|) \quad (34)$$

Then, there are provided the following definitions:

$$Vpp\text{min} = \text{Min}(F(I,J+1,T) - F(I,J,T), F(I+1,J+1,T) - F(I,J,T), -\epsilon, F(I+1,J,T) - F(I,J,T))$$

$$Vmp\text{min} = \text{Min}(F(I-1,J+1,T) - F(I,J,T), F(I,J+1,T) - F(I,J,T), F(I-1,J,T) - F(I,J,T), -\epsilon)$$

$$Vpm\text{min} = \text{Min}(-\epsilon, F(I+1,J,T) - F(I,J,T), F(I,J-1,T) - F(I,J,T), F(I+1,J-1,T) - F(I,J,T))$$

$$Vmm\text{min} = \text{Min}(F(I-1,J,T) - F(I,J,T), -\epsilon, F(I-1,J-1,T) - F(I,J,T), F(I,J-1,T) - F(I,J,T)) \quad (35)$$

$$Vpp\text{max} = \text{Max}(F(I,J+1,T) - F(I,J,T), F(I+1,J+1,T) - F(I,J,T), -\epsilon, F(I+1,J,T) - F(I,J,T))$$

$$Vmp\text{max} = \text{Max}(F(I-1,J+1,T) - F(I,J,T), F(I,J+1,T) - F(I,J,T), F(I-1,J,T) - F(I,J,T), -\epsilon)$$

$$Vpm\text{max} = \text{Max}(-\epsilon, F(I+1,J,T) - F(I,J,T), F(I,J-1,T) - F(I,J,T), F(I+1,J-1,T) - F(I,J,T))$$

$$Vmm\text{max} = \text{Max}(F(I-1,J,T) - F(I,J,T), -\epsilon, F(I-1,J-1,T) - F(I,J,T), F(I,J-1,T) - F(I,J,T)) \quad (36)$$

There are also provided the following definitions:

$$hpp(I,J,T)=Sx(I,J,T)/2+Sx(I,J,T)/2$$

$$hmp(I,J,T)=-Sx(I,J,T)/2+Sx(I,J,T)/2$$

$$hpm(I,J,T)=Sx(I,J,T)/2-Sx(I,J,T)/2$$

$$hmm(I,J,T)=-Sx(I,J,T)/2-Sx(I,J,T)/2 \qquad (37)$$

Further, there is performed the following calculation:

Assuming, for the time being, that an equation phipp=phimp=phipm=phimm=1 holds, if hpp>Vppmax holds, an equation of phipp=Vppmax/hpp is newly defined, while if hpp<Vppmin holds, an equation of phipp=Vppmin/hpp is newly defined;

Similarly, if hpm>Vpmmax holds, an equation of phipm=Vpmmax/hpm is newly defined, while if hpm<Vpmmin holds, an equation of phipm=Vpmmin/hpm is newly defined;

Also, if hmp>Vmpmax holds, an equation of phimp=Vmpmax/hmp is newly defined, while if hmp<Vmpmin holds, an equation of phimp=Vmpmin/hmp is newly defined; and If hmm>Vmmmax holds, an equation of phimm=Vmmmax/hmm is newly defined, while if hmm<Vmmmin holds, an equation of phimm=Vmmmin/hmm is newly defined.

By using the thus obtained values phipp, phimp, phipm, phimm, the above-mentioned coefficients Gx(I,J,T) and Gy(I,J,T) are determined by the following equations:

$$Gx(I, J, T) = \text{Min}(phipp, phipm, phimp, phimm)\, Sx(I, J, T)/\Delta x \qquad (38)$$

$$Gy(I, J, T) = \text{Min}(phipp, phipm, phimp, phimm)\, Sy(I, J, T)/\Delta y$$

Thereafter, the interpolation function H(I,J,T)(x,y) within the grid (I,J) is defined as:

$$H(I,J,T)(x,y)=F(I,J,T)+Gx(I,J,T)x+Gy(I,J,T)y \qquad (39)$$

The interpolation method according to the present embodiment can be summarized as follows:

A cell of interest is set to a cell A, the cell A having a first side extending in an x direction, a second side extending in the x direction and being opposite to the first side, a third side extending in a y direction, and a fourth side extending in the y direction and being opposite to the third side, and values twice as large as values of one-sided differences of the above described function F between the center of the cell A and respective centers of four cells adjacent to the cell A on the first side, the second side, the third side, and the fourth side are defined as a first-sided difference (DFxmin), a second-sided difference (DFxmax), a third-sided difference (DFymin), and a fourth-sided difference (DFymax), respectively. If the first-sided difference and the second-sided difference have different signs, an x-direction difference is set to zero, whereas if the first-sided difference and the second-sided difference have the same sign, the x-direction difference is set to the smaller one of the absolute values of the first-sided difference and the second-sided difference. If the third-sided difference and the fourth-sided difference have different signs, a y-direction difference is set to zero, while if the third-sided difference and the fourth-sided difference have the same sign, the y-direction difference is set to the smaller one of the absolute values of the third-sided difference and the fourth-sided difference. There is formed an interpolation function candidate which has slopes defined by the x-direction difference and the y-direction difference, respectively, and has a value F0 of the above-mentioned function F at the center of the cell A, and this candidate is set to a plane B. If a value of the plane B at a first grid point at a location of intersection of the first side and the third side of the cell A is larger than the value of the center of the cell A, the plane B is modified by multiplying the x-direction difference and the y-direction difference by a largest constant not more than 1 such that the value of the plane B at the first grid point does not exceed any of the values of the function F at respective centers of three cells having the first grid point in common except for the cell A. If the value of the plane B at the first grid point is smaller than the value of the center of the cell A, the plane B is modified by multiplying the x-direction difference and the y-direction difference by a largest constant not more than 1 such that the value of the plane B at the first grid point does not fall below any of the values of the function F at the respective centers of the three cells having the grid point in common except for the cell A. On the plane B thus obtained, the same operation as carried out as to the first grid point is carried out as to a second grid point at a location of intersection of the first side and the fourth side of the cell A, a third grid point at a location of intersection of the second side and the third side, and a fourth grid point at a location of intersection of the second side and the fourth side, to thereby change the slope of the plane B, and the resulting plane is defined as the interpolation function H within the cell A. This algorithm is equivalent to the algorithm described hereinbefore.

Figure 5:
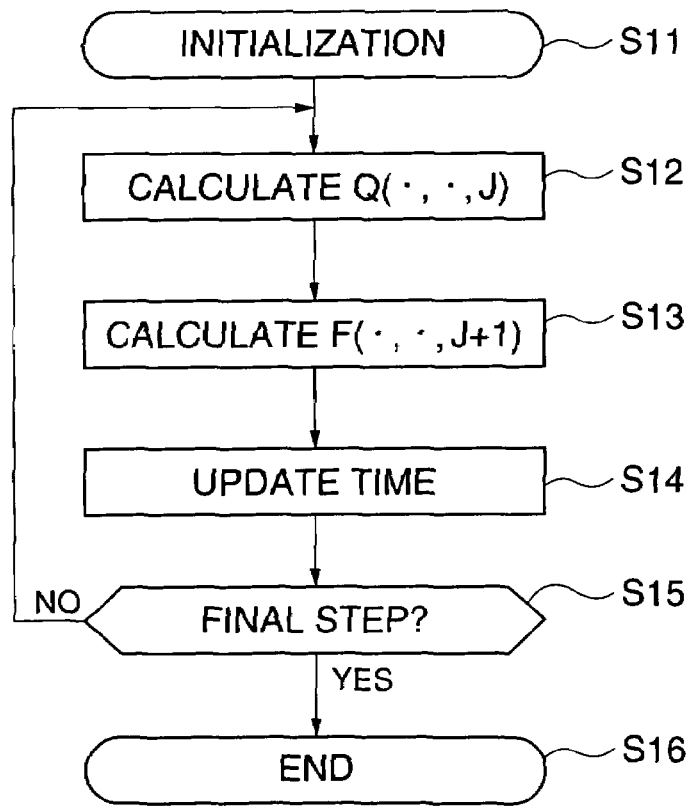
FIG. 5 is a flowchart showing a process of advection calculation using an interpolation method according to a second embodiment of the present invention.

FIG. 5 is a flowchart showing a process of advection calculation using the above described interpolation method according to the second embodiment.

First, in a step S11, initialization is performed, e.g. by generating a grid, determining time step intervals, and then initializing the initial shape of a function F(•,•,1).

In the following step S12, the computation of the above-described equation Q(•,•,J) (see the equations (28) to (31)) is performed. At this time, as shown in the above equations (28) and (29), the interpolation function H according to the present embodiment is used. Then, in a step S13, based on data obtained by the equation Q(•,•,J), the computation of the function F(•,•,J+1) is carried out (see the above equation (32)).

Thereafter, time is updated in a step S14. More specifically, the problem being solved now is a time evolution equation expressed by the above equation (26), and according to the conventional practice of numerical solution of an ordinary time evolution equation, the value F(•,•,J) of the function F at time T=ΔtJ is determined from the value F(•,•,J−1), and then time is changed from T=Δt*(J−1) to T=Δt*J.

Then, in a step S15, it is determined whether or not the present step is a final step, and if the present step is not a final step, the process returns to the step S12, whereby the present computation is performed until it is determined that the present step is a final step.

Figure 6A:
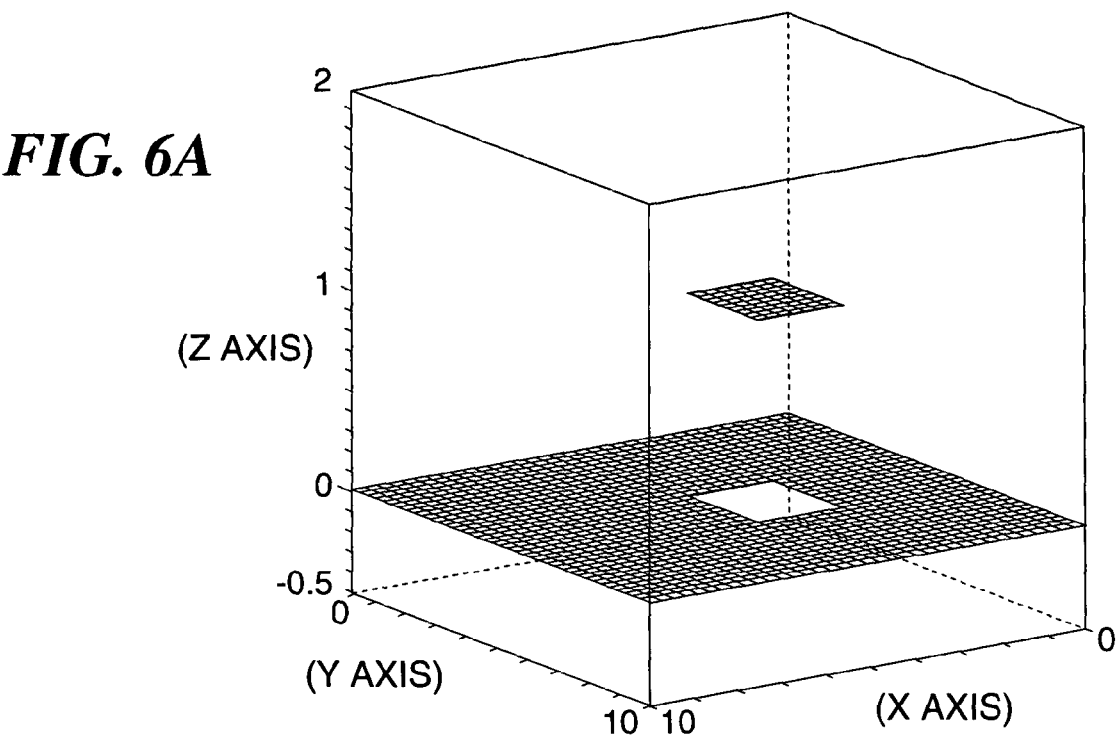
FIGS. 6A and 6B are diagrams showing results of the advection calculation using the interpolation method according to the second embodiment and an interpolation method according to a third embodiment of the present invention.
Figure 6B:
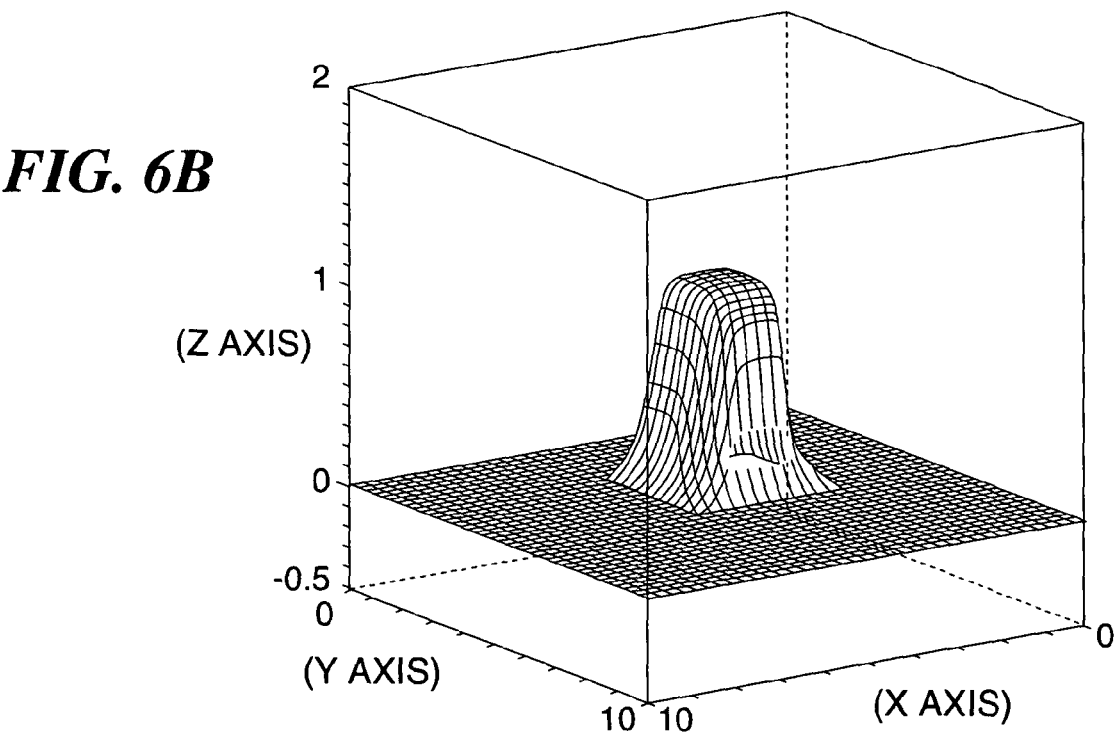
Figure 10A:
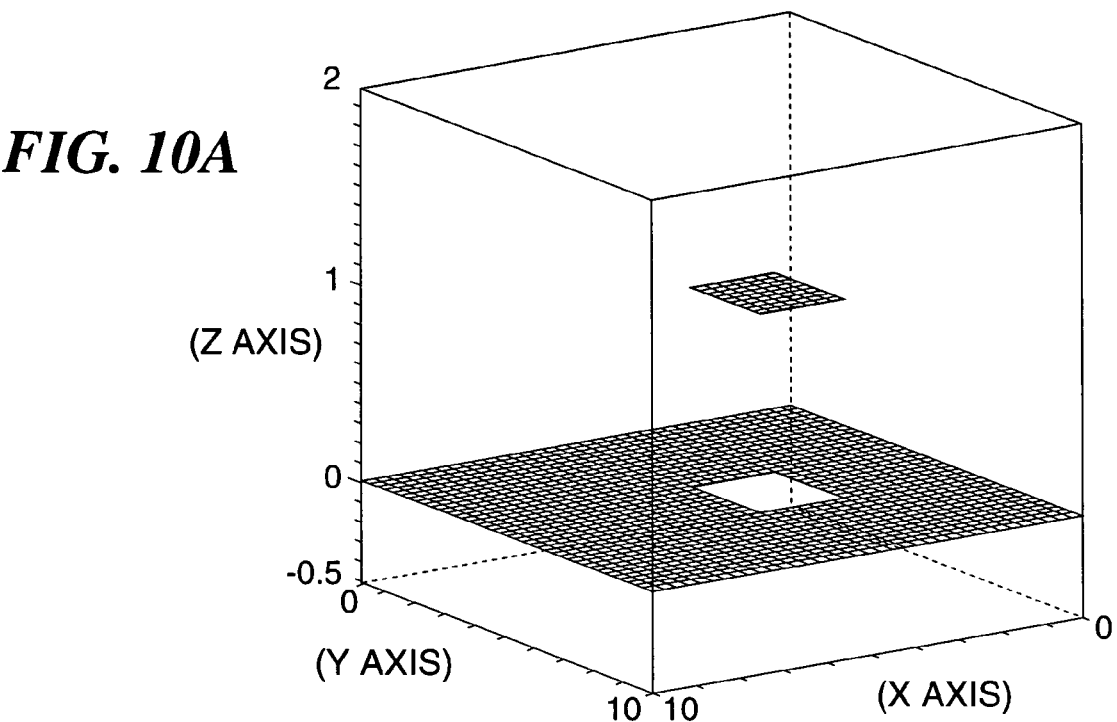
FIGS. 10A and 10*b* are diagrams showing results of advection calculation using a conventional interpolation method (for a higher dimension).
Figure 10B:
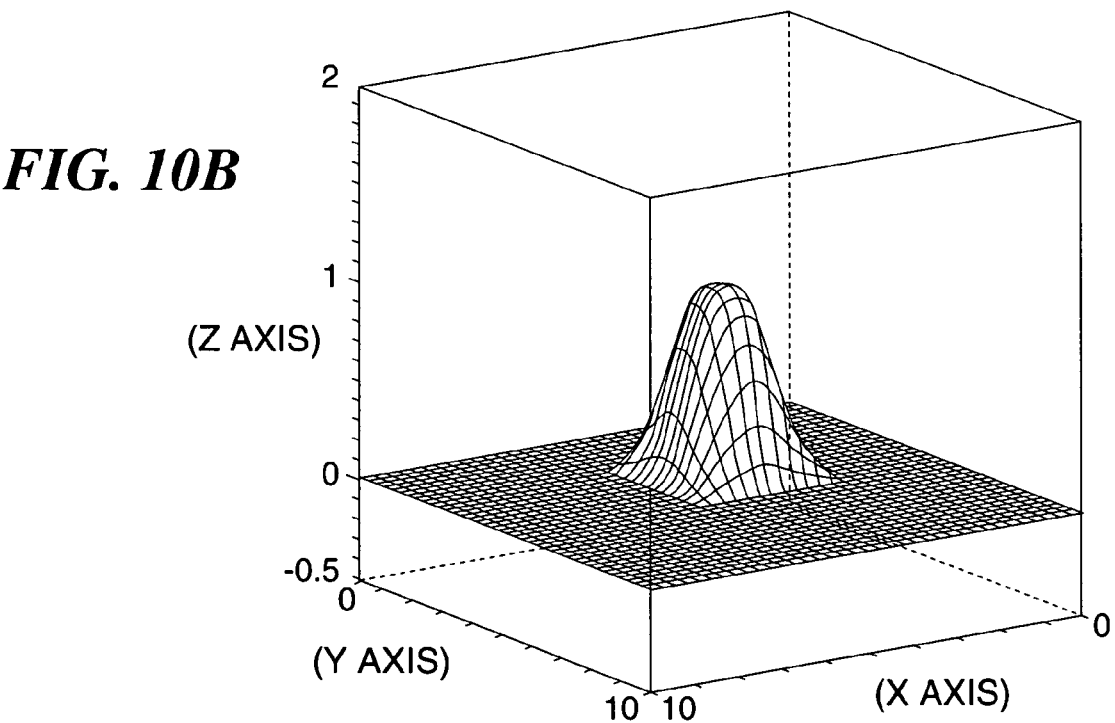

The use of the interpolation method according to the present embodiment provides two separate regions, one defined by a function with a slope of zero, and the other defined by a function with a sharp slope, which makes it possible to obtain very good results as a function describing the shape of a two-phase incompressible fluid. FIGS. 6A and 6B show results of the computation. The present computation is carried out under the same conditions corresponding to those of the conventional computations results of which are shown in FIGS. 10A and 10B, and the shape corresponding to the initial value and that after 1000 steps are depicted in FIGS. 10A and 10B, respectively. It will be understood that the result of advection calculation carried out by the interpolation method according to the present embodiment shown in FIG. 6B maintains a very sharp rectangular shape compared with those shown in FIG. 10B.

The computer for executing the advection calculation using the interpolation function according to the present embodiment is identical to those shown in FIGS. 3 and 4.

Next, a description will be given of an interpolation method according to a third embodiment of the present invention. In the third embodiment, the interpolation algorithm for a two-dimensional grid, described hereinabove as to the second embodiment is extended to one for a three-dimensional grid.

The equation dealt with in the present embodiment is a partial differential equation in a three-dimensional space, defined by:

$$\partial F(x,y,z,t)/\partial t = \partial Cx(x,y,z,t)F(x,y,z,t)/\partial x + \partial Cy(x,y,z,t)F(x,y,z,t)/\partial y + \partial Cz(x,y,z,t)F(x,y,z,t)/\partial z \qquad (40)$$

The problem of converting this function to a difference equation for computation will now be considered. Suppose a function $F(X,Y,Z,T)$ as a discretized form of $F(x,y,z,t)$. The arguments X, Y, Z in the function F cooperatively represent a discrete spacial grid point and the argument T in the same represents a discrete time.

First, it is assumed that an interpolation function $H[I,J,K,T](x,y,z)$ according to the present embodiment has already been obtained as the following piecewise linear function:

$$H[I,J,K,T](x,y,z) = F(I,J,K,T) + Gx(I,J,K,T)x + Gy(I,J,K,T)y + Gz(I,J,K,T)z \qquad (41)$$

With this assumption, a description will be given of a method of numerically solving the above equation (40) by finding a solution thereto by finite difference approximation. A method of determining coefficients $Gx(I,J,K,T)$, $Gy(I,J,K,T)$, and $Gz(I,J,K,T)$ of the interpolation function $H[I,J,K,T](x,y,z)$ of the present embodiment will be described hereinafter. As described later, the method of determining the coefficients $Gx(I,J,K,T)$, $Gy(I,J,K,T)$, and $Gz(I,J,K,T)$ characterizes the interpolation algorithm according to the present embodiment. It is essential to the present embodiment that the coefficients $Gx(I,J,K,T)$, $Gy(I,J,K,T)$, and $Gz(I,J,K,T)$ are determined by using neighboring information of geometric properties of the grid.

In short, when there are provided a three-dimensional structured grid formed on a three-dimensional real region, and a function $F(X,Y,Z,T)$ on the three-dimensional structured grid, the function being defined through definition of a value thereof at the center of each cell within the three-dimensional structured grid at a given time T, the function $F(X,Y,Z,T)$ is defined as an interpolation function $H[I,J,K,T](x,y,z)$ on the three-dimensional real region by extending and interpolating the function $F(X,Y,Z,T)$ through utilization of the function $F(X,Y,Z,T)$ and the geometry of the grid.

If the function $Cx(I+½, J,K,T)$ is positive, there is given the following definition:

$$Qx(I+½,J,K,T):=Cx(I+½,J,K,T)H[I,J,K,T](\Delta x/2 - Cx(I,J,K,T)\Delta t/2, -Cy(I,J,K,T)\Delta t/2, -Cz(I,J,K,T)\Delta t/2) \qquad (42)$$

If the function $Cx(I+½, J,K,T)$ is not positive, there is given the following definition:

$$Qx(I+½,J,K,T):=Cx(I+½,J,K,T)H[I+1,J,K,T](-\Delta x/2 + Cx(I,J,K,T)\Delta t/2, -Cy(I,J,K,T)\Delta t/2, -Cz(I,J,K,T)\Delta t/2) \qquad (43)$$

If the function $Cy(I,J+½, K,T)$ is positive, there is given the following definition:

$$Qy(I,J+½,K,T):=Cy(I,J+½,K,T)H[I,J,K,T](-Cx(I,J,K,T)\Delta t/2, \Delta y/2 - Cy(I,J,K,T)\Delta t/2, -Cz(I,J,K,T)\Delta t/2) \qquad (44)$$

If the function $Cy(I,J+½, K,T)$ is not positive, there is given the following definition:

$$Qy(I,J+½,K,T):=Cy(I,J+½,K,T)H[I,J+1,K,T](-Cx(I,J,K,T)\Delta t/2, -\Delta y/2 - Cy(I,J,K,T)\Delta t/2, -Cz(I,J,K,T)\Delta t/2) \qquad (45)$$

Further, if the function $Cz(I,J,K+½, T)$ is not positive, there is given the following definition:

$$Qz(I,J,K+½,T):=Cz(I,J,K+½,T)H[I,J,K,T](-Cx(I,J,K,T)\Delta t/2, -Cy(I,J,K,T)\Delta t/2, \Delta z/2 - Cz(I,J,K,T)\Delta t/2) \qquad (46)$$

If the function $Cy(I,J,K+½, T)$ is not positive, there is given the following definition:

$$Qz(I,J,K+½,T):=Cz(I,J,K+½,T)H[I,J,K+1,T](-Cx(I,J,K,T)\Delta t/2, -Cy(I,J,K,T)\Delta t/2, -\Delta z/2 - Cz(I,J,K,T)\Delta t/2) \qquad (47)$$

From the above definitions, there is obtained the following equation:

$$F(I,J,K,T+1) = F(I,J,K,T) + \Delta t(Qx(I+½,J,K,T) - Qx(I-½,J,K,T))/\Delta x + \Delta t(Qy(I,J+½,K,T) - Qy(I,J-½,K,T))/\Delta y + \Delta t(Qz(I,J,K+½,T) - Qz(I,J,K-½,T))/\Delta z \qquad (48)$$

On the other hand, a slope function $G(I,J,K,T)$ representative of the slope of the piecewise linear function is defined in the following manner:

First, there are introduced the following definitions:

$$Sxp(I,J,K,T):=F(I+1,J,K,T)-F(I,J,K,T)$$

$$Sxm(I,J,K,T):=F(I,J,K,T)-F(I-1,J,K,T)$$

$$Syp(I,J,K,T):=F(I,J+1,K,T)-F(I,J,K,T)$$

$$Sym(I,J,K,T):=F(I,J,K,T)-F(I,J-1,K,T)$$

$$Szp(I,J,K,T):=F(I,J,K+1,T)-F(I,J,K,T)$$

$$Szm(I,J,K,T):=F(I,J,K,T)-F(I,J,K-1,T) \qquad (49)$$

Further, there are introduced limiter functions in one dimension for the present embodiment, defined by:

$$Sx(I,J,K)=(sgn(Sxp(I,J,K,T))+sgn(Sxm(I,J,K,T)))\text{Min}(|Sxp(I,J,K,T)|,|Sxm(I,J,K,T)|)$$

$$Sy(I,J,K)=(sgn(Syp(I,J,K,T))+sgn(Sym(I,J,K,T)))\text{Min}(|Syp(I,J,K,T)|,|Sym(I,J,K,T)|)$$

$$Sz(I,J,K)=(sgn(Szp(I,J,K,T))+sgn(Szm(I,J,K,T)))\text{Min}(|Szp(I,J,K,T)|,|Szm(I,J,K,T)|) \qquad (50)$$

Then, there are provided the following definitions:

$$Vpppmin=\text{Min}(F(I,J+1,K,T)-F(I,J,K,T),F(I+1,J+1,K,T)-F(I,J,K,T),-\epsilon,F(I+1,J,K,T)-F(I,J,K,T),F(I,J+1,K+1,T)-F(I,J+1,K+1,T)-F(I,J,K,T),F(I+1,K+1,T)-F(I,J,K,T),F(I,J,K+1,T)-F(I,J,K,T), F(I+1,J,K+1,T)-F(I,J,K,T))$$

$$Vmppmin=\text{Min}(F(I-1,J+1,K,T)-(I,J,K,T),F(I,J+1,K,T)-F(I,J,K,T),F(I-1,J,K,T)-F(I,J,K,T),-\epsilon,F(I-1,J+1,K+1,T)-F(I,J,K,T),F(I,J+1,K+1,T)-F(I,J,K,T),F(I-1,J,K+1,T)-F(I,J,K,T),F(I,J,K+1,T)-F(I,J,K,T))$$

$$Vpmpmin=\text{Min}(-\epsilon,F(I+1,J,K,T)-F(I,J,K,T),F(I,J-1,K,T)-F(I,J,K,T),F(I+1,J-1,K,T)-F(I,J,K,T),F(I,J,K+1,T)-F(I,J,K,T),F(I+1,J,K+1,T)-F(I,J,K,T)F(I,J-1,K+1,T)-F(I,J,K,T),F(I+1,J-1,K+1,T)-F(I,J,K,T))$$

$Vmmp\text{min}=\text{Min}(F(I-1,J,K,T)-F(I,J,K,T),-\epsilon,F(I-1,J-1,K,T)-F(I,J,K,T),F(I,J-1,K,T)-F(I,J,K,T),F(I-1,J,K+1,T)-F(I,J,K,T),F(I,J,K+1,T)-F(I,J,K,T),F(I-1,J-1,K+1,T)-F(I,J,K,T),F(I,J-1,K+1,T)-F(I,J,K,T))$ $Vppm\text{min}=\text{Min}(F(I,J+1,K,T)-(I,J,K,T),F(I+1,J+1,K,T)-F(I,J,K,T),-\epsilon,F(I+1,J,K,T)-F(I,J,K,T),F(I,J+1,K-1,T)-F(I,J,K,T),F(I+1,J+1,K-1,T)-F(I,J,K,T),F(I,J,K-1,T),-F(I,J,K,T),F(I+1,J,K-1,T)-F(I,J,K,T))$ $Vmpm\text{min}=\text{Min}(F(I-1,J+1,K,T)-(I,J,K,T),F(I,J+1,K,T)-F(I,J,K,T),F(I-1,J,K,T)-F(I,J,K,T),-\epsilon,F(I-1,J+1,K-1,T)-F(I,J,K,T),F(I,J+1,K-1,T)-F(I,J,K,T),F(I-1,J,K-1,T)-F(I,J,K,T),F(I,J,K-1,T)-F(I,J,K,T))$ $Vpmm\text{min}=\text{Min}(-\epsilon,F(I+1,J,K,T)-F(I,J,K,T),F(I,J-1,K,T)-F(I,J,K,T),F(I+1,J-1,K,T)-F(I,J,K,T),F(I,J,K-1,T)-F(I,J,K,T),F(I+1,J,K-1,T)-F(I,J,K,T),F(I,J-1,K-1,T)-F(I,J,K,T),F(I+1,J-1,K-1,T)-F(I,J,K,T))$ $Vmmm\text{min}=\text{Min}(F(I-1,J,K,T)-F(I,J,K,T),-\epsilon,F(I-1,J-1,K,T)-F(I,J,K,T),F(I,J-1,K,T)-F(I,J,K,T),F(I-1,J,K-1,T)-F(I,J,K,T),F(I,J,K-1,T)-F(I,J,K,T),F(I-1,J-1,K-1,T)-F(I,J,K,T),F(I,J-1,K-1,T)-F(I,J,K,T))$ (51)

$Vppp\text{max}=\text{Max}(F(I,J+1,K,T)-(I,J,K,T),F(I+1,J+1,K,T)-F(I,J,K,T),-\epsilon,F(I+1,J,K,T)-F(I,J,K,T),F(I,J+1,K+1,T)-F(I,J,K,T),F(I+1,J+1,K+1,T)-F(I,J,K,T),F(I,J,K+1,T)-F(I,J,K,T),F(I+1,J,K+1,T)-F(I,J,K,T))$ $Vmpp\text{max}=\text{Max}(F(I-1,J+1,K,T)-(I,J,K,T),F(I,J+1,K,T)-F(I,J,K,T),F(I-1,J,K,T)-F(I,J,K,T),-\epsilon,F(I-1,J+1,K+1,T)-F(I,J,K,T),F(I,J+1,K+1,T)-F(I,J,K,T),F(I-1,J,K+1,T)-F(I,J,K,T),F(I,J,K+1,T)-F(I,J,K,T))$ $Vpmp\text{max}=\text{Max}(-\epsilon,F(I+1,J,K,T)-F(I,J,K,T),F(I,J-1,K,T)-F(I,J,K,T),F(I+1,J-1,K,T)-F(I,J,K,T),F(I,J,K+1,T)-F(I,J,K,T),F(I-1,J,K1,T)-F(I,J,K,T),F(I,J-1,K+1,T)-F(I,J,K,T),F(I+1,J,-1,K+1,T)-F(I,J,K,T))$ $Vmmp\text{max}=\text{Max}(F(I-1,J,K,T)-F(I,J,K,T),-\epsilon,F(I-1,J-1,K,T)-F(I,J,K,T),F(I,J-1,K,T)-F(I,J,K,T),F(I-1,J,K+1,T)-F(I,J,K,T),F(I,J,K+1,T)-F(I,J,K,T),F(I-1,J-1,K-1,T)-F(I,J,K,T),F(I,J-1,K+1,T)-F(I,J,K,T))$ $Vppm\text{max}=\text{Max}(F(I,J+1,K,T)-(I,J,K,T),F(I+1,J+1,K,T)-F(I,J,K,T),-\epsilon,F(I+1,J,K,T)-F(I,J,K,T),F(I,J+1,K-1,T)-F(I,J,K,T),F(I+1,J+1,K-1,T)-F(I,J,K,T),F(I,J,K-1,T)-F(I,J,K,T),F(I+1,J,K-1,T)-F(I,J,K,T))$ $Vmpm\text{max}=\text{Max}(F(I-1,J+1,K,T)-(I,J,K,T),F(I,J+1,K,T)-F(I,J,K,T),F(I-1,J,K,T)-F(I,J,K,T),-\epsilon,F(I-1,J+1,K-1,T)-F(I,J,K,T),F(I,J+1,K-1,T)-F(I,J,K,T),F(I-1,J,K-1,T)-F(I,J,K,T),F(I,J,K-1,T)-F(I,J,K,T))$ $Vpmm\text{max}=\text{Max}(-\epsilon,F(I+1,J,K,T)-F(I,J,K,T),F(I,J-1,K,T)-F(I,J,K,T),F(I+1,J-1,K,T)-F(I,J,K,T),F(I,J,K-1,T)-F(I,J,K,T),F(I+1,J,K-1,T)-F(I,J,K,T),F(I,J-1,K-1,T)-F(I,J,K,T),F(I+1,J-1,K-1,T)-F(I,J,K,T))$ $Vmmm\text{max}=\text{Max}(F(I-1,J,K,T)-F(I,J,K,T),-\epsilon,F(I-1,J-1,K,T)-F(I,J,K,T),F(I,J-1,K,T)-F(I,J,K,T),F(I-1,J,K-1,T)-F(I,J,K,T),F(I,J,K-1,T)-F(I,J,K,T),F(I-1,J-1,K-1,T)-F(I,J,K,T),F(I,J-1,K-1,T)-F(I,J,K,T))$ (52)

There are also provided the following definitions:

$hppp(I,J,K,T)=Sx(I,J,K,T)/2+Sx(I,J,K,T)/2+Sz(I,J,K,T)/2$ $hmpp(I,J,K,T)=-Sx(I,J,K,T)/2+Sx(I,J,K,T)/2+Sz(I,J,K,T)/2$ $hpmp(I,J,K,T)=Sx(I,J,K,T)/2-Sx(I,J,K,T)/2+Sz(I,J,K,T)/2$ $hmmp(I,J,K,T)=-Sx(I,J,K,T)/2-Sx(I,J,K,T)/2+Sz(I,J,K,T)/2$ $hppm(I,J,K,T)=Sx(I,J,K,T)/2+Sx(I,J,K,T)/2-Sz(I,J,K,T)/2$ $hmpm(I,J,K,T)=-Sx(I,J,K,T)/2+Sx(I,J,K,T)/2-Sz(I,J,K,T)/2$ $hpmm(I,J,K,T)=Sx(I,J,K,T)/2-Sx(I,J,K,T)/2-Sz(I,J,K,T)/2$ $hmmm(I,J,K,T)=-Sx(I,J,K,T)/2-Sx(I,J,K,T)/2-Sz(I,J,K,T)/2$ (53)

Further, there is performed the following calculation:

Assuming, for the time being, that an equation phippp=phimpp=phipmp=phimmp=phippm=phimpm=phipmm=phimmm=1 holds, if hppp>Vpppmax holds, an equation of phippp=Vpppmax/hppp is newly defined, while if hppp<Vpppmin holds, an equation of phippp=Vpppmin/hppp is newly defined;

Similarly, if hpmp>Vpmpmax holds, an equation of phipmp=Vpmpmax/hpmp is newly defined, while if hpmp<Vpmpmin holds, an equation of phipmp=Vpmmin/hpmp is newly defined;

Also, if hmpp>Vmppmax holds, an equation of phimpp=Vmppmax/hmpp is newly defined, while if hmpp<Vmppmin holds, an equation of phimpp=Vmppmin/hmpp is newly defined;

If hmmp>Vmmpmax holds, an equation of phimmp=Vmmpmax/hmmp is newly defined, while if hmmp<Vmmpmin holds, an equation of phimmp=Vmmpmin/hmmp is newly defined;

If hppm>Vppmmax holds, an equation of phippm=Vppmmax/hppm is newly defined, while if hppm<Vppmmin holds, an equation of phippm=Vppmmin/hppm is newly defined;

If hpmm>Vpmmmax holds, an equation of phipmm=Vpmmmax/hpmm is newly defined, while if hpmm<Vpmmmin holds, an equation of phipmm=Vpmmmin/hpmm is newly defined;

If hmpm>Vmpmmax holds, an equation of phimpm=Vmpmmax/hmpm is newly defined, while if hmpm<Vmpmmin holds, an equation of phimpm=Vmpmmin/hmpm is newly defined; and If hmmm>Vmmmmax holds, an equation of phimmm=Vmmmmax/hmmp is newly defined, while if hmmm<Vmmmmin holds, an equation of phimmm=Vmmmmin/hmmm is newly defined.

By using the thus obtained values phippp, phimpp, phipmp, phimmp, phippm, phimpm, phipmm, phimmm, the above-mentioned coefficients Gx(I,J,K,T), Gy(I,J,K,T), and Gz(I,J,K,T) are determined by the following equations:

$Gx(I,J,K,T)=\text{Min}(phippp,phimpp,phipmp,phimmp,$
$\quad phippm,phimpm,phipmm,phimmm)Sx(I,J,K,T)/\Delta x$ $Gy(I,J,K,T)=\text{Min}(phippp,phimpp,phipmp,phimmp,$
$\quad phippm,phimpm,phipmm,phimmm)Sy(I,J,K,T)/\Delta y$ $Gz(I,J,K,T)=\text{Min}(phippp,phimpp,phipmp,phimmp,$
$\quad phippm\ phimpm,phipmm,phimmm)Sz(I,J,K,T)/\Delta z$ Thereafter, the interpolation function H(I,J,K,T)(x,y,z) within the grid (I,J,K) is defined as:

$$H[I,J,K,T](x,y,z)=F(I,J,K,T)+Gx(I,J,K,T)x+Gy(I,J,K,T)y+Gz(I,J,K,T)z \quad (54)$$

The interpolation method according to the present embodiment can be summarized as follows:

A cell of interest is set to a cell A, the cell A having a first side (face, in this three-dimensional grid) extending in an x direction, a second side extending in the x direction and being opposite to the first side, a third side extending in a y direction, a fourth side extending in the y direction and being opposite to the third side, a fifth side in a z direction, and a sixth side extending in the z direction and being opposite to the fifth side, and values twice as large as values of one-sided differences of the above described function F between the center of the cell A and respective centers of six cells adjacent to the cell A on the first side, the second side, the third side, the fourth side, the fifth side, and the sixth side are defined as a first-sided difference (DFxmin), a second-sided difference (DFxmax), a third-sided difference (DFymin), a fourth-sided difference (DFymax), a fifth-sided difference (DFzmax), and a sixth-sided difference (DFzmin), respectively. If the first-sided difference and the second-sided difference have different signs, an x-direction difference is set to zero, whereas if the first-sided difference and the second-sided difference have the same sign, the x-direction difference is set to the smaller one of the absolute values of the first-sided difference and the second-sided difference. If the third-sided difference and the fourth-sided difference have different signs, a y-direction difference is set to zero, while if the third-sided difference and the fourth-sided difference have the same sign, the y-direction difference is set to the smaller one of the absolute values of the third-sided difference and the fourth-sided difference. If the fifth-sided difference and the sixth-sided difference have different signs, a z-direction difference is set to zero, while if the fifth-sided difference and the sixth-sided difference have the same sign, the z-direction difference is set to the smaller one of absolute values of the fifth-sided difference and the sixth-sided difference. There is formed an interpolation function candidate which has slopes defined by the x-direction difference, the y-direction difference, and the z-direction difference, respectively, and has a value F0 of the above-mentioned function F at the center of the cell A, and this candidate is set to a plane B. If a value of the plane B at a first grid point at a location of intersection of the first side, the third side, and the fifth side of the cell A is larger than the value of the center of the cell A, the plane B is modified by multiplying the x-direction difference, the y-direction difference, and the z-direction difference by a largest constant not more than 1 such that the value of the plane B at the first grid point does not exceed any of the values of the function F at respective centers of seven cells having the first grid point in common except for the cell A. If the value of the plane B at the first grid point is smaller than the value of the center of the cell A, the plane B is modified by multiplying the x-direction difference, the y-direction difference, and the z-direction difference by a largest constant not more than 1 such that the value of the plane B at the first grid point does not fall below any of the values of the function f at the respective centers of the seven cells having the grid point in common except for the cell A.

On the plane B as the candidate interpolation function thus obtained, the same operation as carried out as to the first grid point is carried out as to a second grid point at a location of intersection of the first side, the third side, and the sixth side, a third grid point at a location of intersection of the first side, the fourth side, and the fifth side, a fourth grid point at a location of intersection of the first side, the fourth side, and the sixth side, a fifth grid point at a location of intersection of the second side, the third side, and the fifth side, and a sixth grid point at a location of intersection of the second side, the third side, and the sixth side, a seventh grid point at a location of intersection of the second side, the fourth side, and the fifth side, and an eighth grid point at a location of intersection of the second side, the fourth side, and the sixth side, to thereby change the slope of the plane B, and the resulting plane is defined as the interpolation function H within the cell A. This algorithm is equivalent to the algorithm described hereinbefore.

A flowchart of an advection calculation using the interpolation method of the present embodiment is the same as shown in FIG. 5. Further, the interpolation method according to the third embodiment can be realized by the same computer described hereinbefore with reference to FIGS. 3 and 4. In the present embodiment as well, it is possible to carry out the advection calculation while maintaining a sharp shape of the function as is the case with the interpolation method for a two-dimensional space according to the above described second embodiment.

If the interpolation methods according to the second and third embodiments are used, it is possible to form a function in a two-dimensional or three-dimensional space based on values given to grid points of the space although the values include discontinuities. By virtue of this feature, even when the interpolation method according to the present invention is applied to other uses than the above described embodiments, e.g. reproduction of image data, detailing data of a digital two-dimensional or three-dimensional object, it is possible to express a sharp shape in the same manner.

Furthermore, the present invention is not limited to the apparatuses according to the above described embodiments but may be either applied to a system composed of a plurality of apparatuses or to a single apparatus.

It is to be understood that the object of the present invention may be accomplished by supplying a system or an apparatus with a storage medium in which a program code of software which realizes the functions of any of the above described embodiments, and causing a computer (CPU or MPU) of the system or apparatus to read out and execute the program code stored in the storage medium.

In this case, the program code itself read from the storage medium realizes the functions of any of the above described embodiments, and hence the storage medium on which the program code is stored constitutes the present invention.

Examples of the storage medium for supplying the program code include a floppy (registered trademark) disk, a hard disk, an optical disk, a magneto optical disk, a CD-ROM, a CD-R, a CD-RW, a DVD-ROM, a DVD-RAM, a DVD-RW, a DVD+RW, a magnetic tape, a nonvolatile memory card, and a ROM. Downloading via a network can also be utilized.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An apparatus for carrying out an interpolation method of defining a function F on a one-dimensional structured grid formed on a one-dimensional real region, the function being defined through definition of a value thereof at a center of each cell within the one-dimensional structured grid, as an interpolation function H, to produce image data indicative of an object, the apparatus comprising:
   a setting device that sets, with respect to a cell of interest on the one-dimensional structured grid, a slope to zero if a forward difference and a backward difference of the function F have different signs, and to a value twice as large as a smaller one of absolute values of the forward difference and the backward difference if the forward difference and the backward difference have the same sign;
   a definition device that defines the function F on a partial region of the one-dimensional real region determined by the cell of interest, by a linear function having a value of F0 at a center of the cell of interest and the slope; and
   an outputting device that outputs image data according to the function F.

2. An apparatus for carrying out an interpolation method of defining a function F on a two-dimensional structured grid formed on a two-dimensional real region, the function being defined through definition of a value thereof at a center of each cell within the two-dimensional structured grid, as an interpolation function H, to produce image data indicative of an object, the apparatus comprising:
   a cell-setting device that sets a cell of interest to a cell A, the cell A having a first side extending in an x direction, a second side extending in the x direction and being opposite to the first side, a third side extending in a y direction, and a fourth side extending in the y direction and being opposite to the third side;
   a difference-setting device that defines values twice as large as values of one-sided differences of the function F between a center of the cell A and respective centers of four cells adjacent to the cell A on the first side, the second side, the third side, and the fourth side, as a first-sided difference (DFxmin), a second-sided difference (DFxmax), a third-sided difference (DFymin), and a fourth-sided difference (DFymax), respectively, and sets an x-direction difference to zero if the first-sided difference and the second-sided difference have different signs, and to a smaller one of absolute values of the first-sided difference and the second-sided difference if the first-sided difference and the second-sided difference have the same sign, and a y-direction difference to zero if the third-sided difference and the fourth-sided difference have different signs, and to a smaller one of absolute values of the third-sided difference and the fourth-sided difference if the third-sided differences and the fourth-sided difference have the same sign;
   an interpolation function candidate-forming device that forms an interpolation function candidate which has slopes defined by the x-direction difference and the y-direction difference respectively, and has a value F0 of the function F at the center of the cell A and setting this candidate to a plane B;
   a first modification device that modifies, if a value of the plane B at a first grid point at a location of intersection of the first side and the third side of the cell A is larger than a value of the center of the cell A, the plane B by multiplying the x-direction difference and the y-direction difference by a largest constant not more than 1 such that the value of the plane B at the first grid point does not exceed any of values of the function F at respective centers of three cells having the first grid point in common except for the cell A;
   a second modification device that modifies, if the value of the plane B at the first grid point is smaller than the value of the center of the cell A, the plane B by multiplying the x-direction difference and the y-direction difference by a largest constant not more than 1 such that the value of the plane B at the first grid point does not fall below any of the values of the function F at the respective centers of the three cells having the grid point in common except for the cell A;
   a definition device that carries out, on the plane B thus obtained, the same operation as carried out as to the first grid point, as to a second grid point at a location of intersection of the first side and the fourth side of the cell A, a third grid point at a location of intersection of the second side and the third side, and a fourth grid point at a location of intersection of the second side and the fourth side, to thereby change the slope of the plane B, and define the resulting plane as the interpolation function within the cell A; and
   an difference-setting device that outputs image data according to the function F.

3. An apparatus for carrying out an interpolation method of defining a function F on a three-dimensional structured grid formed on a three-dimensional real region, the function being defined through definition of a value thereof at a center of each cell within the three-dimensional structured grid, as an interpolation function H, to Produce image data indicative of an object, the apparatus comprising:
   a cell-setting device that sets a cell of interest to a cell A, the cell A having a first side extending in an x direction, a second side extending in the x direction and being opposite to the first side, a third side extending in a y direction, a fourth side extending in the y direction and being opposite to the third side, a fifth side in a z direction, and a sixth side extending in the z direction and being opposite to the fifth side;
   a difference-setting device that defines values twice as large as values of one-sided differences of the function F between a center of the cell A and respective centers of six cells adjacent to the cell A on the first side, the second side, the third side, the fourth side, the fifth side, and the sixth side, as a first-sided difference (DFxmin), a second-sided difference (DFxmax), a third-sided difference (DFymin), a fourth-sided difference (DEymax), a fifth-sided difference (DFzmax), and a sixth-sided difference (DFzmin), respectively, and sets an x-direction difference to zero if the first-sided difference and the second-sided difference have different signs, and to a smaller one of absolute values of the first-sided difference and the second-sided difference if the first-sided difference and the second-sided difference have the same sign, a y-direction difference to zero if the third-sided difference and the fourth-sided difference have different signs, and to a smaller one of absolute values of the third-sided difference and the fourth-sided difference if the third-sided differences and the fourth-sided difference have the same sign, and a z-direction difference to zero if the fifth-sided difference and the sixth-sided difference have different signs, and to a smaller one of absolute values of the fifth-sided difference and the sixth-sided difference if the fifth-sided difference and the sixth-sided difference have the same sign;

an interpolation function candidate-forming device that forms an interpolation function candidate which has slopes defined by the x-direction difference, the y-direction difference, and the z-direction difference, respectively, and has a value F0 of the function F at the center of the cell A, and setting this candidate to a plane B;

a first modification device that modifies, if a value of the plane B at a first grid point at a location of intersection of the first side, the third side, and the fifth side of the cell A is larger than the value of the center of the cell A, the plane B by multiplying the x-direction difference, the y-direction difference, and the z-direction difference, by a largest constant not more than 1 such that the value of the plane B at the first grid point does not exceed any of the values of the function F at respective centers of seven cells having the first grid point in common except for the cell A;

a second modification device that modifies, if the value of the plane B at the first grid point is smaller than the value of the center of the cell A, the plane B by multiplying the x-direction difference, the y-direction difference, and the z-direction difference, by a largest constant not more than 1 such that the value of the plane B at the first grid point does not fall below any of the values of the function F at the respective centers of the seven cells having the grid point in common except for the cell A; and a definition device that carries out, on the plane B thus obtained, the same operation as carried out as to the first grid point, on a second grid point at a location of intersection of the first side, the third side, and the sixth side, a third grid point at a location of intersection of the first side, the fourth side, and the fifth side, a fourth grid point at a location of intersection of the first side, the fourth side, and the sixth side, a fifth grid point at a location of intersection of the second side, the third side, and the fifth side, and a sixth grid point at a location of intersection of the second side, the third side, and the sixth side, a seventh grid point at a location of intersection of the second side, the fourth side, and the fifth side, and an eighth grid point at a location of intersection of the second side, the fourth side, and the sixth side, to thereby change the slope of the plane, and define the resulting plane as the interpolation function within the cell A.

* * * * *